United States Patent
Podilchuk et al.

(10) Patent No.: US 10,339,650 B2
(45) Date of Patent: Jul. 2, 2019

(54) METHOD AND MEANS OF CAD SYSTEM PERSONALIZATION TO REDUCE INTRAOPERATOR AND INTEROPERATOR VARIATION

(71) Applicant: Koios Medical, Inc., New York City, NY (US)

(72) Inventors: Christine I. Podilchuk, Piscataway, NJ (US); Ajit Jairaj, Piscataway, NJ (US); Lev Barinov, Piscataway, NJ (US); William Hulbert, Piscataway, NJ (US); Richard Mammone, Piscataway, NJ (US)

(73) Assignee: Koios Medical, Inc., New York, NY (US)

( * ) Notice: Subject to any disclaimer, the term of this patent is extended or adjusted under 35 U.S.C. 154(b) by 0 days.

(21) Appl. No.: 15/200,719

(22) Filed: Jul. 1, 2016

(65) Prior Publication Data
US 2017/0200266 A1    Jul. 13, 2017

Related U.S. Application Data

(60) Provisional application No. 62/276,143, filed on Jan. 7, 2016.

(51) Int. Cl.
*G06T 7/00* (2017.01)
*G06K 9/62* (2006.01)
*G06T 7/11* (2017.01)

(52) U.S. Cl.
CPC .......... *G06T 7/0012* (2013.01); *G06K 9/6232* (2013.01); *G06K 9/6278* (2013.01);
(Continued)

(58) Field of Classification Search
None
See application file for complete search history.

(56) References Cited

U.S. PATENT DOCUMENTS 5,260,871 A    11/1993    Goldberg
7,418,119 B2   8/2008     Leichter et al.
(Continued)

FOREIGN PATENT DOCUMENTS

CN    105913086 A    8/2016
WO    WO 2007/138533    12/2007

OTHER PUBLICATIONS

Search Report for United Kingdom Application No. GB1703624.5, dated Aug. 21, 2017, 4 pages.
(Continued)

*Primary Examiner* — Matthew C Bella
*Assistant Examiner* — Brian D Shin

(57) ABSTRACT

A system and method is disclosed to reduce variation of the clinical decision making process when an image reporting and data system (IRADS) for medical diagnosis is used. Image reporting and data systems provide guidelines for an operator to identify images as belonging to one of a number of categories and specific clinical actions are then recommended based upon such categories. Some clinical actions such as biopsies may be recommended by IRADS even when they are not necessary. The present inventive concept is configured to utilize a Computer-Assisted Diagnosis (CAD) system that is specifically programmed to minimize discrepancies between the recommended clinical actions of an individual or specific group of experts using the standard IRADS process and the optimum clinical actions based on correlation with biopsy proven data. The resulting CAD system reduces the number of unnecessary clinical actions such as biopsies based on the operator's error profile.

22 Claims, 15 Drawing Sheets

| Category | | Management | Likelihood of cancer |
|---|---|---|---|
| 0 | Need additional imaging or prior examinations | Recall for additional imaging and/or await prior examinations | n/a |
| 1 | Negative | Routine screening | Essentially 0% |
| 2 | Benign | Routine screening | Essentially 0% |
| 3 | Probably Benign | Short interval follow up (6 month) or continued | > 0% but ≤ 2% |
| 4 | Suspicious | Tissue diagnosis | 4a. low suspicion for malignancy (> 2% to ≤ 10%) |
| | | | 4b. moderate suspicion for malignancy (> 10% to ≤ 50%) |
| | | | 4c. high suspicion for malignancy (> 50% to ≤ 95%) |
| 5 | Highly suggestive of malignancy | Tissue diagnosis | ≥ 95% |
| 6 | Known biopsy proven | Surgical excision when clinical appropriate | n/a |

(52) U.S. Cl.
CPC ...... *G06T 7/11* (2017.01); *G06T 2207/20081* (2013.01); *G06T 2207/30068* (2013.01); *G06T 2207/30096* (2013.01)

(56) References Cited

U.S. PATENT DOCUMENTS

| | | | |
|---|---|---|---|
| 7,570,051 | B2 | 8/2009 | Haider |
| 9,536,054 | B1 | 1/2017 | Podilchuk et al. |
| 2004/0184644 | A1* | 9/2004 | Leichter ............... G06K 9/033 382/128 |
| 2004/0254816 | A1 | 12/2004 | Myers |
| 2005/0010445 | A1* | 1/2005 | Krishnan ............ G06F 19/321 705/2 |
| 2005/0049497 | A1 | 3/2005 | Krishnan et al. |
| 2005/0059876 | A1 | 3/2005 | Krishnan et al. |
| 2005/0244041 | A1 | 11/2005 | Tecotzky et al. |
| 2006/0122467 | A1* | 6/2006 | Harrington ............ A61B 6/502 600/300 |
| 2006/0210133 | A1 | 9/2006 | Krishnan et al. |
| 2007/0076957 | A1 | 4/2007 | Wang et al. |
| 2007/0133852 | A1* | 6/2007 | Collins .................. A61B 8/08 382/128 |
| 2009/0093711 | A1 | 4/2009 | Valadez |
| 2010/0121178 | A1 | 5/2010 | Krishnan et al. |
| 2010/0200660 | A1 | 8/2010 | Moed et al. |
| 2014/0066767 | A1 | 3/2014 | Mammone et al. |
| 2014/0122515 | A1 | 5/2014 | Lee et al. |
| 2016/0109955 | A1 | 4/2016 | Park et al. |
| 2016/0125265 | A1 | 5/2016 | Xie et al. |
| 2016/0133028 | A1 | 5/2016 | Park |
| 2017/0200268 | A1 | 7/2017 | Podilchuk et al. |

OTHER PUBLICATIONS

International Search Report and Written Opinion for International Application No. PCT/US20171046565, dated Sep. 12, 2017, 9 pages.

Office Action for U.S. Appl. No. 15/451,086, dated Sep. 11, 2017, 10 pages.

International Search Report and Written Opinion for International Application No. PCT/US2017/047995, dated Nov. 7, 2017, 16 pages.

Vinyals, O. et al., "Show and Tell: A Neural Image Caption Generator," arXiv:1411.4555v2 [cs.CV], Apr. 20, 2015, 9 pages.

Berg, W. A. et al., "Breast-Imaging Reporting and Data System: Inter- and Intraobserver Variability in Feature Analysis and Final Assessment," AJR 2000;174:1769-1777. Retrieved from the Internet: <URL: http://www.ajronline.org>, by Rutgers University on Apr. 8, 2016.

Jorritsma, W. et al., "Improving the radiologist-CAD interaction: designing for appropriate trust," Clinical Radiology, 70 (2015) 115-122.

Croskerry, P., "The Importance of Cognitive Errors in Diagnosis and Strategies to Minimize Them," Academic Medicine, Aug. 2003, 78(8):775-780.

Barinov, L. et al., "Decision Quality Support in Diagnostic Breast Ultrasound through Artificial Intelligence," IEEE Signal Processing in Medicine and Biology Symposium (SPMB), SPMB-L3.03, Dec. 3, 2016.

Baker, J A, et al., Breast cancer: prediction with artificial neural network based on BI-RADS standardized lexicon, Radiology Society of North America, Sep. 1995, vol. 196, Issue 3, http://pubs.rsna.org/doi/abs/10.1148/radiology.196.37644649.

Huang, Zhen, et al., Beyond Cross-entropy: Towards better frame-level objective functions for deep neural network training in automatic speech recognition, ISCA, Sep. 2014, 1214-1218, http://research.microsoft.com/pubs/230081/IS140944.pdf.

Leichter, Isaac, et al., Computerized Classification Can Reduce Unnecessary Biopsies in BI-RADS Category 4A Lesions, IWDM 2006, LNCS 4046, pp. 76-83, 2006.

* cited by examiner

10

| | Final Assessment Categories | | |
|---|---|---|---|
| | Category | Management | Likelihood of cancer |
| 0 | Need additional imaging or prior examinations | Recall for additional imaging and/or await prior examinations | n/a |
| 1 | Negative | Routine screening | Essentially 0% |
| 2 | Benign | Routine screening | Essentially 0% |
| 3 | Probably Benign | Short interval follow up (6 month) or continued | > 0% but ≤ 2% |
| 4 | Suspicious | Tissue diagnosis | 4a. low suspicion for malignancy (> 2% to ≤ 10%)<br>4b. moderate suspicion for malignancy (> 10% to ≤ 50%)<br>4c. high suspicion for malignancy (> 50% to ≤ 95%) |
| 5 | Highly suggestive of malignancy | Tissue diagnosis | ≥ 95% |
| 6 | Known biopsy proven | Surgical excision when clinical appropriate | n/a |

FIG. 1

METHOD AND MEANS OF CAD SYSTEM PERSONALIZATION TO REDUCE INTRAOPERATOR AND INTEROPERATOR VARIATION

CROSS-REFERENCE TO RELATED APPLICATION

This patent application claims priority to U.S. Patent Application Ser. No. 62/276,143 filed Jan. 7, 2016, the entire contents of which is herein incorporated by reference in its entirety.

BACKGROUND

1. Field

The present inventive concept relates generally to medical imaging and analysis; and, more particularly to a system and method to enhance clinical decision making capability within the context of an image reporting and data system (IRADS) for medical diagnosis. The present inventive concept provides a computer-assisted diagnosis (CAD) system that is programmed to minimize the deviations in recommended clinical actions due to the biases of a group or individual in interpreting the rules of the system.

2. Discussion of Related Art

Over 1,300,000 breast biopsies are performed in the United States and over 4,500,000 breast biopsies are performed worldwide each year. Of these biopsies, 80% have benign findings. Breast biopsies are traumatic experiences that expose patients to clinical risk, are uncomfortable, and are costly.

A trained medical professional such as a radiologist will generally attempt to identify and classify regions of suspicion within a medical image either manually or by using computer software. The radiologist may then manually characterize each region of suspicion in accordance with a relevant grading system. For example, suspicious regions of interest within the breast may be characterized according to Breast Imaging Reporting and Data Systems (BI-RADS) guidelines. BI-RADS is a widely-accepted risk assessment and quality assurance tool used by radiologists for diagnosing breast cancer using mammography, ultrasound, or MRI. The classification assigned to each region of suspicion may dictate the future course of action. For example, if the region of suspicion is classified as likely malignant, then a biopsy may be ordered. If the region of suspicion is classified as normal, then no further action may be taken. If, however, the region of suspicion is classified as probably benign, then the course of action may be to repeat the test in six months to look for any changes. The BI-RADS reporting methodology includes a standard lexicon and structure for reporting purposes which enables radiologists to provide a succinct review of image based findings and to communicate the results to the referring physician in a clear and consistent fashion with a final assessment and a specific course of action. Structured reporting also helps accelerate report turnaround time (TAT), simplify documentation for billing and regulatory compliance, and ease the process of data extraction for utilization review, quality assurance, and research. Through medical audit and outcome monitoring, the system provides important mechanisms for peer review and quality assurance data to improve the quality of patient care. Results compiled in a standardized manner permit the maintenance and collection analysis of demographic and outcome data.

The success of BI-RADS since its inception for mammography in 1993 has spurred the introduction of many more similar checklist-based systems for various medical image reporting and data systems. A partial list of similar reporting and data systems include Prostate Imaging-Reporting and Data System (PI-RADS), Thyroid Imaging Reporting and Data System (TI-RADS), Liver Imaging Reporting and Data System (LI-RADS), and Lung-RADS for prostate, thyroid, liver and lung cancer diagnosis, respectively.

As illustrated by FIG. 1, the basic BI-RADS Assessment Categories are:
 1: Negative,
 2: Benign,
 3: Probably benign,
 4. Suspicious, and
 5: Highly suggestive of malignancy.

There is also a category 0 (BI-RADS 0) and a category 6 (BI-RADS 6). A BI-RADS 0 indicates an incomplete classification which warrants either an effort to ascertain prior imaging for comparison or to call the patient back for additional views, higher quality films or additional imaging modalities. A BI-RADS 6 indicates a proven malignancy previously proven by biopsy.

The BI-RADS 4 classification is frequently divided into sub-categories of:
 4A: low suspicion for malignancy,
 4B: moderate suspicion for malignancy, and
 4C: highly suspicious for malignancy.

The recommended patient management provided by the BI-RADS system is: if the region of interest is classified as suspicious or highly suspicious, i.e., BI-RADS 4 or BI-RADS 5, then a biopsy should be ordered. If the region of suspicion is classified as normal or benign, i.e., BI-RADS 1 or BI-RADS 2, then no further action may be taken. If, however, the region of suspicion is classified as probably benign, i.e., BI-RADS 3, then the recommendation is a 6-month follow-up to look for any changes. The BI-RADS score is a statistic that is correlated with malignancy and not a deterministic measure of malignancy. It has been shown that category 3 (less than 2 percent risk of malignancy) or category 4 (probability of cancer, ranging from 3 percent to 94 percent) lesions are considered different degrees of malignant breast lesions. This is especially true for hyperplastic nodules in category 3, which are considered to be uncertain ones. Such lesions do not have obvious characteristics of benign lesions, but they are still considered subjectively as category 3 lesions. There are 1-2 non-benign characteristics of category 4 lesions, but the American College of Radiology does not provide any detailed guidance. This leads to poor inter-observer consistency in classification with resulting discrepancies from the ideal use of the BI-RADS system. In addition, Category 4a typically consists of 90% to 98% benign lesions, 4b consists of 50% to 90% benign lesions and 4c consists of 5% to 50% benign lesions and BI-RADS 5 has 0% to 5% benign lesions but all must go to biopsy. Therefore, as many as 80% of the biopsies performed on the patients with a category BI-RADS 4 or BI-RADS 5 are found to be benign.

It is with these observations in mind, among others, that various aspects of the present inventive concept were conceived and developed.

SUMMARY

The present inventive concept provides a computerized system with a method to avoid unnecessary biopsies and recalls by separating benign lesions from cancer lesions in the lesions that are determined to be categories BI-RADS 4, BI-RADS 5, or BI-RADS 3, respectively. The system and method of the present inventive concept is advantageously operable to reduce a large number of breast biopsies performed every year on patients who do not have breast cancer, thus saving billions of dollars in healthcare expenses, unnecessary emotional stress, and avoiding increased difficulty in future diagnosis due to scar tissue from prior biopsies.

The aforementioned may be achieved in one aspect of the present disclosure by providing a method of assisting diagnosis of a disease state within an image, comprising: utilizing a computer-assisted diagnosis (CAD) computing device comprising at least one processing unit in communication with at least one tangible storage media, the tangible storage media further including computer executable instructions for performing operations of: utilizing machine learning to train the CAD computing device, by providing a training data set associated with a series of training images, at least a portion of the training data set comprising image features associated with known classes of a plurality of classes, the plurality of classes associated with predetermined possible clinical actions, determining a cost function of weighted error terms, and weighting certain parameters of the cost function for certain image feature values associated with known examples of clinical significance that are predetermined as being important to diagnose; receiving a selected image by an interface, the selected image comprising an image feature; and utilizing the trained CAD computing device to give a specific clinical action, by extracting at least one image feature value from the selected image, and applying the at least one image feature value to the CAD computing device trained using the weighted cost function to identify a class from the plurality of classes as defined during the machine learning.

In some embodiments, each of the plurality of classes are associated with different categories of a Breast Imaging Reporting and Data System (BI-RAD) lexicon; and the weighting of certain parameters of the cost function is selected to provide more weight for error terms that correspond to incorrectly categorizing a cancer lesion as a benign lesion (BI-RADS category 1, 2 or 3) by using the BI-RAD lexicon, incorrectly categorizing a recall according to a category 3 of the BI-RAD lexicon as a benign lesion by using the BI-RAD lexicon, or incorrectly categorizing a benign lesion as a cancer or malignant lesion by using the BI-RAD lexicon.

The aforementioned may be achieved in another aspect of the present disclosure by a method to assist in diagnosis of a disease state within an image, the method comprising the steps of: acquiring an image; identifying one or more regions of interest within data of the image; and using a computer-assisted diagnosis CAD system configured to recommend at least one clinical action based on a minimization of discrepancies between an evidence based action and a recommended action by another system for a specific user or group of specific users.

The aforementioned may be achieved in another aspect of the present disclosure by a system configured to assist in diagnosis of a disease state within an image, comprising: a processor configured to (i) receive an input in the form of an image, (ii) identify one or more regions of interest within data of the image, and (iii) output a recommend clinical action via a user interface, wherein, the recommended clinical action is based on a minimization of discrepancies between an evidence based action and traditional system recommended actions.

In some embodiments, the process of the aforementioned system may be configured to imply a category, and the implied category may comprise an IRAD classification. In other embodiments, the system may be configured to utilize a color overlay on the original image to indicate an impact of each sub-region on the recommended clinical decision.

BRIEF DESCRIPTION OF THE DRAWINGS

The foregoing and other objects, features, and advantages of the present inventive concept set forth herein should be apparent from the following description of particular embodiments of those inventive concepts, as illustrated in the accompanying drawings. The drawings depict only typical embodiments of the present inventive concept and, therefore, are not to be considered limiting in scope.

FIG. 1 is a chart illustrating final assessment categories of a conventional system.

Figure 2:
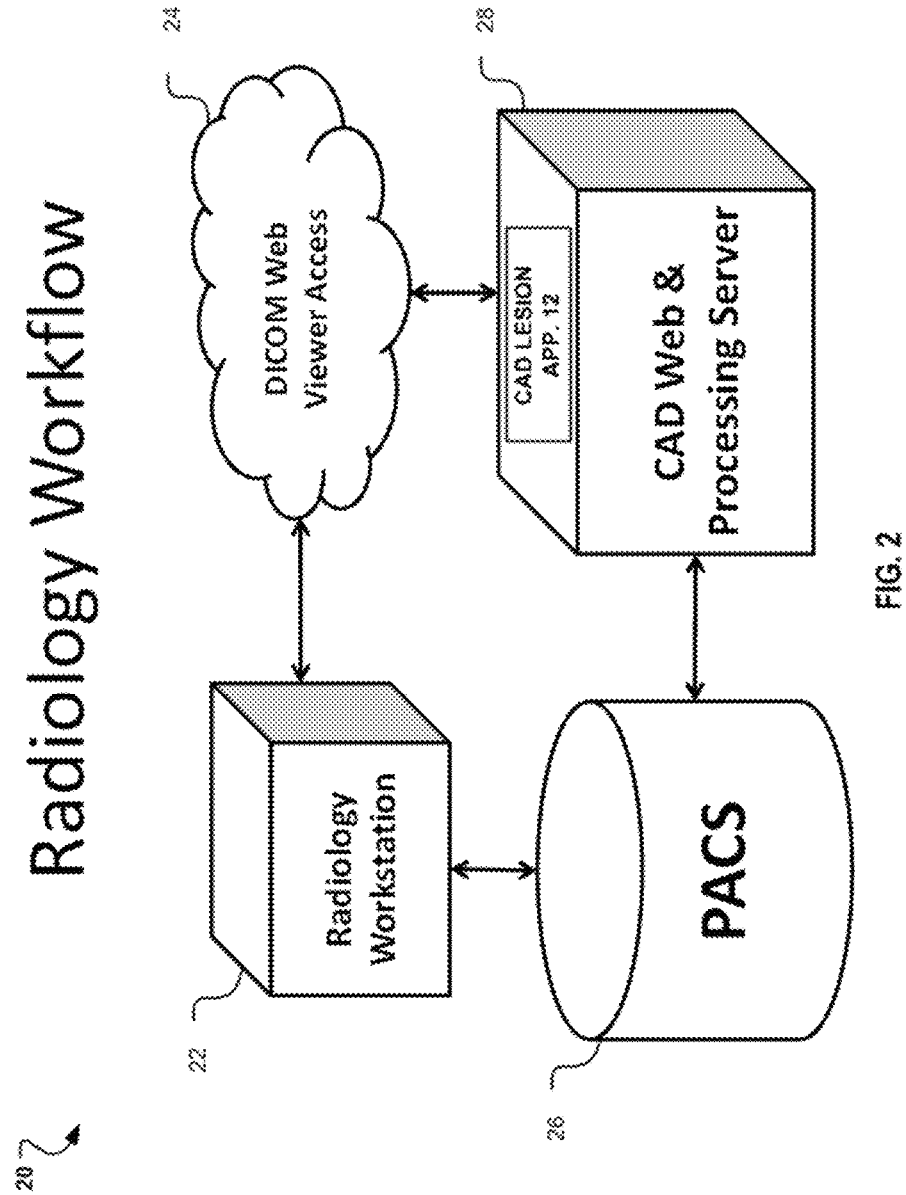
FIG. 2 is an exemplary workflow system, according to aspects of the present inventive concept.

The drawing figures do not limit the present inventive concept to the specific embodiments disclosed and described herein. The drawings are not necessarily to scale, emphasis instead being placed on clearly illustrating principles of certain embodiments of the present inventive concept.

DETAILED DESCRIPTION

The following detailed description references the accompanying drawings that illustrate various embodiments of the present inventive concept. The illustrations and description are intended to describe aspects and embodiments of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

I. Terminology

In the description, terminology is used to describe features of the present inventive concept. For example, references to terms "one embodiment," "an embodiment," "the embodiment," or "embodiments" mean that the feature or features being referred to are included in at least one aspect of the present inventive concept. Separate references to terms "one embodiment," "an embodiment," "the embodiment," or "embodiments" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure as described herein are not essential for its practice.

The term "algorithm" refers to logic, hardware, firmware, software, and/or a combination thereof that is configured to perform one or more functions including, but not limited to, those functions of the present inventive concept specifically described herein or are readily apparent to those skilled in the art in view of the description. Such logic may include circuitry having data processing and/or storage functionality. Examples of such circuitry may include, but are not limited to, a microprocessor, one or more processors, e.g., processor cores, a programmable gate array, a microcontroller, an application specific integrated circuit, a wireless receiver, transmitter and/or transceiver circuitry, semiconductor memory, or combinatorial logic.

The term "logic" refers to computer code and/or instructions in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical, or other form of propagated signals such as carrier waves, infrared signals, or digital signals. Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "user" is generally used synonymously herein to represent a user of the system and/or method of the present inventive concept. For purposes herein, the user may be a clinician, a diagnostician, a doctor, a technician, a student, and/or an administrator.

The terms "identified," "processed," and "selected" are generally used synonymously herein, regardless of tense, to represent a computerized process that is automatically performed or executed by the system in one or more processes via at least one processor.

The acronym "CAD" means Computer-Assisted Diagnosis.

The term "client" means any program of software that connects to a CAD lesion application.

The term "server" typically refers to a CAD lesion application that is listening for one or more clients unless otherwise specified.

The term "post-processing" means an algorithm applied to an inputted ultrasound image.

The acronym "PACS" means Picture Archival and Communication System.

The acronym "GSPS" means Grayscale Softcopy Presentation State.

The acronym "DICOM" means Digital Imaging and Communications in Medicine.

The acronym "UI" means User Interface.

The acronym "PHI" means Private Health Information.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As the present inventive concept is susceptible to embodiments of many different forms, it is intended that the present disclosure be considered as an example of the principles of the present inventive concept and not intended to limit the present inventive concept to the specific embodiments shown and described.

II. General Architecture

Aspects of the present inventive concept provide a system and method that utilizes a Computer-Assisted Diagnosis (CAD) lesion software application on a computing device. The system may comprise a CAD lesion application and a centralized web service to provide user access to the CAD lesion application where a user device has an active network connection and an Internet browser. A user operating a user device may interact with the computing device and the CAD lesion application by initiating a session using the browser. The user may then select one or more PACS servers, and conduct a search for relevant images to process using one or more algorithms of the CAD lesion application. A region of interest (ROI) may be selected and retrieved, with the ROI encompassing legions of interest. The ROI may be submitted for processing by the CAD lesion application.

A prepopulated shape, orientation, and/or putative BIRAD bucket category or category bucket may be returned to the clinician. A bucket, in this context, may refer to a plurality of classes or categories of a BI RAD lexicon. An example of a BI-RAD category bucket might be two buckets where one encompasses BI-RADS categories 1, 2, and 3 and the second bucket consists of BI-RADS categories 4 and 5. The first bucket indicates a biopsy is not recommended whereas the second bucket indicates that a biopsy is in fact recommended. Alternatively, three buckets could be used where the first bucket consists of BI-RADS categories 1 and 2, the second bucket denotes BI-RADS category 3, and the third bucket represents BI-RADS categories 4 and 5. Here, the recommended clinical actions would be no biopsy or follow up recommended for the first bucket, a follow-up visit is recommended for the second bucket, and a biopsy is recommended for the third bucket. Another example is where five buckets are used and each bucket is equivalent to one of the five IRAD categories. The clinician may then modify, or update the putative BIRADS bucket before submitting the validated IRAD bucket to the CAD lesion application. The CAD lesion application may then return to the clinician a final BI RAD bucket assessment or recommendation.

This recommendation to the clinician, provided by the CAD lesion application, may then be stored in a Digital Imaging and Communications in Medicine (DICOM) compliant Grayscale Softcopy Presentation State (GSPS), (as outlined in Supplement 33 of the American College of Radiology (ACR)/National Electrical Manufacturer's Association (NEMA)/DICOM standard) and can be returned to the PACS server for storage as an addendum to the original series. This may increase a likelihood that the original data contained within the images is in no way altered or otherwise modified. The recommendation could alternatively be stored in a portable document format (PDF) report, or other digital format.

The CAD lesion application may provide an augmented and automated assessment of lesion characteristics to help guide a user, e.g., a diagnostician and/or a clinician, in assessing Breast Imaging-Reporting and Data System (BI-RAD) classification for a lesion with an ultrasound image. The original un-augmented image may be available to the user for review and may be supplemented versus being, e.g., replaced, by the post processed assessment as a GSPS or similar means. This may be accomplished by overlaying the original image with the GSPS which is the default behavior when viewed within the described application and systems thereby providing a view where both images are visible or alternating between views. The CAD lesion application, in combination with other aspects of an image reporting and data system, provide guidelines for an operator to identify images as belonging to one of a number of categories where each category is associated with a broad level of suspicion of disease. Specific clinical actions may then be recommended for the tissue whose image falls within each category. Some clinical actions such as biopsies may be recommended by IRADS even when they are not necessary. The present inventive concept utilizes the CAD lesion application and a CAD system that is specifically programmed to minimize discrepancies between recommended clinical actions of an individual or specific group of experts using the standard IRADS process, and the optimum clinical actions, based on correlation with biopsy proven data. The resulting CAD system reduces the number of unnecessary clinical actions such as biopsies based on the operator's error profile.

As previously described, the present inventive concept incorporates aspects of the BI-RADS Assessment Categories as shown in FIG. 1. FIG. 2 comprises a CAD system 20 utilizing a radiology workflow implementing various aspects of the present inventive concept. The CAD system 20 may comprise a radiology workstation 22, a DICOM web viewer access 24, a PACS server 26, and a CAD web and processing server 28.

The radiology workstation 22 may comprise at least one high-definition monitor, an adjustable clinician/operator desk, a power supply, a desktop computer or other such computing device, cable peripherals, a power supply, and PACS-specific peripheral such as a PACS back light, and PACS monitor device holders/frames.

The PACS server 26 may comprise a system for digital storage, transmission, and retrieval of medical images such as radiology images. The PACS server 26 may comprise software and hardware components which directly interface with imaging modalities. The images may be transferred from the PACS server 26 to external devices for viewing and reporting.

The CAD web and processing server 28 may comprise at least one of an application server, web server, processing server, network server, mainframe, desktop computer, or other computing device. The CAD web and processing server 28 may comprise at least one Windows based, tower, or rack form factor server. The CAD web and processing server 28 may be operable to provide a client side user interface implemented in JavaScript, HTML, or CSS. The CAD web and processing server 28 may comprise a server side interface implemented in e.g. Microsoft ASP/.NET, C#/PHP, or the like. The CAD web and processing server 28 may utilize one or more cloud services to extend access and service to clients, such as the radiology workstation 22.

The CAD web and processing server 28 may communicate with the radiology workstation 22 via a network using the DICOM web viewer access 24. The DICOM web viewer access 24 may comprise a medical image viewer and may run on any platform with a modern browser such as a laptop, tablet, smartphone, Internet television, or other computing device. It is operable to load local or remote data in DICOM format (the standard for medical imaging data such as magnetic resonance imaging (MRI), computerized tomography (CT), Echo, mammography, etc.) and provides standard tools for its manipulations such as contrast, zoom, drag, drawing for certain regions of images, and image filters such as threshold and sharpening. In one embodiment, the radiology workstation 22 may communicate with the CAD web and processing server 28 by implementing the DICOM web viewer access 24 via a web browser of a computing device of the radiology workstation 22.

The CAD web and processing server 28 may implement aspects of a CAD lesion application 12 which provides an augmented and automated assessment of lesion characteristics to help guide a diagnostician and/or clinician in assessing BIRAD classification for a lesion, as described in greater detail below. The CAD lesion application 12 may be implemented in C++, but other programming languages are contemplated. The CAD lesion application 12 may be compatible with and utilize aspects of an operating system such as Windows XP, Windows Vista, Windows 7, Windows 8, Windows 10, and their embedded counterparts. The CAD lesion application 12 may be hardware agnostic and may be implemented on a variety of different computing devices such as application servers, network servers, mainframes, desktop computers, or the like. The CAD lesion application 12 may utilize an external interface which may be accessed by a user, such as a clinician. The clinician may select a region of interest and the CAD lesion application 12 may return a set of prepopulated lesions characteristics and BIRADs bucket grading which can then be updated with additional descriptors by the clinician and then finalized for storage as an addendum to the series of images in the PACS server 26.

The CAD lesion application 12 may be installed to or otherwise reside on an operating system of a computing device, such as the CAD web and processing server 28. The CAD lesion application 12 may comprise a self-contained application which need not rely upon any core functionality outside of the operating system within which it resides. The CAD lesion application 12 may include a DICOM interface that allows the CAD lesion application 12 to receive DICOM data as well as return such data to the originator of the transaction. In some embodiments, there is no variation in implementation or operation for a local topology variant aside from pointing all network addresses back to the local host. The may absolve the architecture from requiring, while still supporting, external network infrastructure and may keep the CAD lesion application 12 and all processing local to the computing device where it is being executed.

Figure 3:
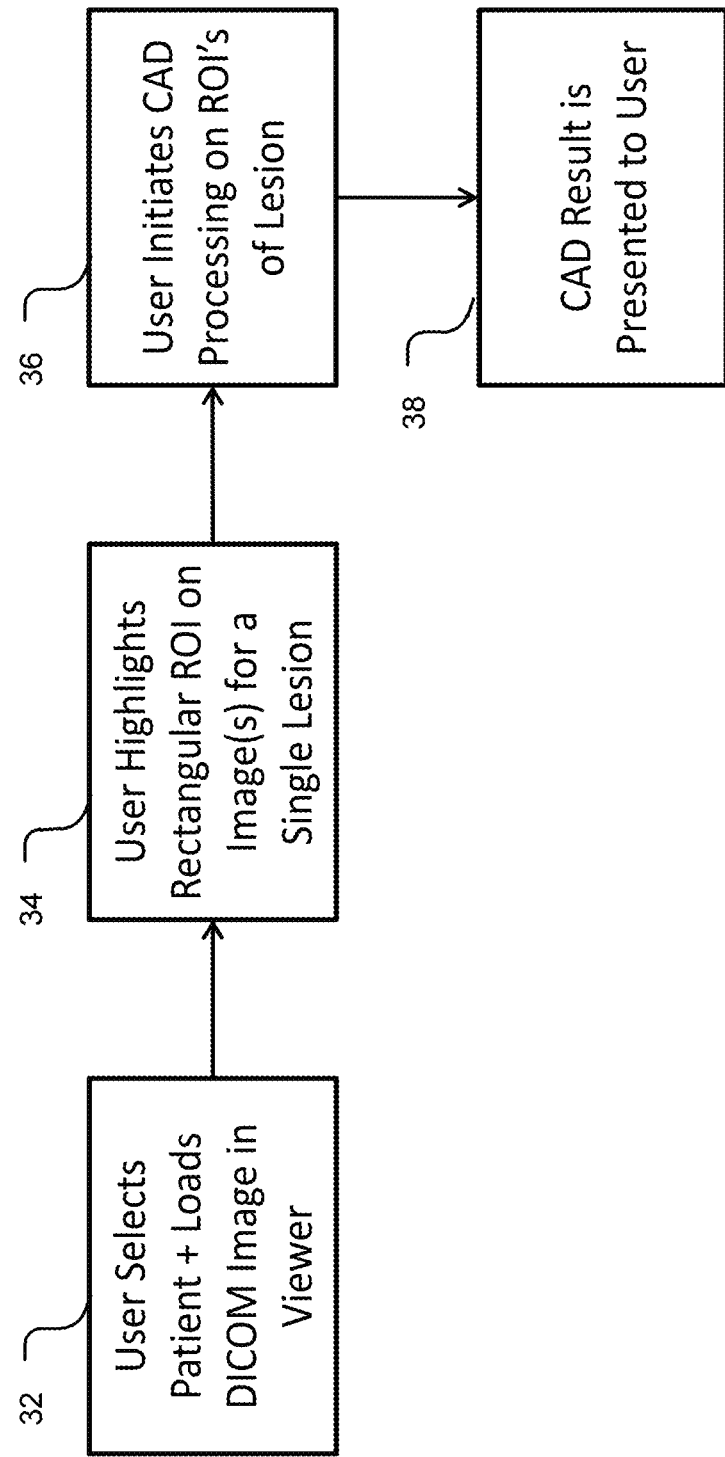
FIG. 3 illustrates an exemplary workflow for a user, according to aspects of the present inventive concept.

Workflow of a user 30 utilizing the CAD system 20 of FIG. 2 is shown in FIG. 3 with respect to image analysis of a lesion. As shown in block 32, a user, such as a diagnostician, may select a patient and load DICOM images in a viewer, such as the DICOM web viewer access 24. In block 34, the user highlights at least one ROI, which may be highlighted in a rectangular form or other shape, for a single lesion. In block 36, the user initiates a CAD processing on the ROI/s of the lesion. In block 38, the CAD result is presented to the user. The aforementioned steps may be implemented using aspects of the CAD lesion application 12 and the CAD web and processing server 28.

The system and method of the present inventive concept is advantageously operable to reduce the large number of breast biopsies performed every year on patients who do not have breast cancer, thus saving billions of dollars in healthcare expenses, unnecessary emotional stress, and increase difficulty in future diagnosis due to scar tissue. The system and method of the present inventive concept is advantageously operable to avoid unnecessary biopsies by separating benign lesions from cancer lesions in the lesions that are determined to be a category BI-RADS 4 or BI-RADS 5.

One general aspect of the present inventive concept comprises a method and means to enhance the clinical decision making capability within the context of an image reporting and data system (IRADS) for medical diagnosis such as BI-RADS. The present inventive concept uses a CAD system 20, comprising a CAD web and processing server 28, that is programmed, using the CAD lesion application 12, to minimize discrepancies between the standard IRADS recommended clinical action and the optimum clinical action. For example, lesions that would be categorized, as BI-RADS 4 or BI-RADS 5 would be further identified as not requiring biopsy by the new system when the CAD lesion application identifies the lesions as benign.

The CAD web and processing server 28 is operable to minimize discrepancies between clinically recommended actions dictated by a traditional IRADS and optimal clinical action recommendations for the specific case of interest as given by the image or images under consideration. A training phase of the system of the present inventive concept defines four types of "errors" where two types of errors represent the discrepancies between traditional and revised clinical actions. The CAD training process of the present inventive concept includes a personalized training data set which is used by the individual or group of experts to calibrate the IRAD recommended action label for a set of predetermined training images. The error terms may comprise the following four (4) items:

(1) Images of proven disease tissue where the IRADS has correctly identified the optimal action, for example a breast lesion that is proven to be malignant by biopsy and experts using the BI-RADS system have identified the image as a category (BI-RADS 4 or 5) with the optimal action i.e. a biopsy is recommended.

(2) Images of proven benign tissue where the IRADS system has correctly identified the optimal action, for example a breast lesion that is proven to be benign and the individual or group or experts using the BI-RADS system identifies the image as a category (BI-RADS 1, 2, or 3) with the optimal action i.e. a biopsy is not recommended.

(3) Images of proven benign tissue where the IRADS system has incorrectly identified the optimal action, for example a breast lesion that is proven to be benign and experts using the BI-RADS system identify the image as a category (BI-RADS 4 or 5) with the optimal action i.e. a biopsy is recommended.

(4) Images of proven malignant tissue where the IRADS system has incorrectly identified the optimal action, for example a breast lesion that is proven to be malignant and the individual or group of experts using the BI-RADS system identifies the image as a category (BI-RADS 1, 2, or 3) with the optimal action i.e. a biopsy is not recommended.

In one embodiment, the training phase of the present inventive concept may employ a measure, e.g., a sum of squares, for each of these four cases which are represented here as E1, E2, E3 and E4. The training phase of the present inventive concept minimizes an objective function O where each measure of error is weighted by a weight given by Wi to yield the objective function given by: $O = W_1 E_1 + W_2 E_2 + W_3 E_3 + W_4 E_4$.

The CAD web and processing server 28 is configured to be trained using an objective function of this form to yield a greater number of preferred recommendations for one or more IRADS categories.

Another contribution of the present inventive concept is to provide a cost effective recommendation which minimizes clinical risk. The expected cost that an image represented by a feature vector x from a selected ROI belongs to class 0 is given by:

$$L(x, \text{Class0}) = P(\text{Class0}/\text{BI-RADS 1})P(\text{BI-RADS 1}/x)C(\text{BI-RADS 1}, \text{Class0}) + P(\text{Class0}/\text{BI-RADS 2})P(\text{BI-RADS 2}/x)C(\text{BI-RADS 2}, \text{Class0}) + P(0/\text{BI-RADS 3})P(\text{BI-RADS 3}/x)C(\text{BI-RADS 3}, \text{Class0}) + P(0/\text{BI-RADS 4})P(\text{BI-RADS 4}/x)C(\text{BI-RADS 4}, \text{Class0}) + P(\text{Class 0}/\text{BI-RADS 5})P(\text{BI-RADS 5}/x)C(\text{BI-RADS 5}, \text{Class0})$$

And the expected cost that the image with feature vector x belongs to class 1 is:

$$L(x, \text{Class1}) = P(\text{Class1}/\text{BI-RADS 1})P(\text{BI-RADS 1}/x)C(\text{BI-RADS 1}, \text{Class1}) + P(\text{Class1}/\text{BI-RADS 2})P(\text{BI-RADS 2}/x)C(\text{BI-RADS 2}, \text{Class1}) + P(1/\text{BI-RADS 3})P(\text{BI-RADS 3}/x)C(\text{BI-RADS 3}, \text{Class1}) + P(1/\text{BI-RADS 4})P(\text{BI-RADS 4}/x)C(\text{BI-RADS 4}, \text{Class1}) + P(\text{Class 1}/\text{BI-RADS 5})P(\text{BI-RADS 5}/x)C(\text{BI-RADS 5}, \text{Class1})$$

Where

L(x, 0) is the expected cost that an image represented by the vector x is determined to be in category 0

L(x, 1) is the expected cost that the image represented by the vector x is determined to be in category 1

The binary class 0 or 1 that will be the output of the present invention will recommend a clinical action that should be acted upon (possibly denoted by class 1) or not acted upon (possibly denoted class 0). For example:

Class 0 might be a recommendation that the region of interest represents a benign lesion and class 1 might indicate that the selected region of interest represents a high level of suspicion of containing cancer; or Class 0 might be a recommendation to not perform a biopsy and class 1 might be a recommendation to perform a biopsy; or Class 0 might be a recommendation to not have a 6 month follow up and class 1 might represent the recommendation to perform a 6 month follow up.

Other clinical decisions can be represented by binary or multiclass representations in this way.

The conditional probabilities given by:

P(A/B) is the probability of A given B so for example:

P(Class 0/BI-RADS 1) is the probability of being in class 0 given that the image was labeled as BI-RADS 1

The terms of the form P(BI-RADS i) denote the probably of an image being assigned a BI-RADS category of i. The terms of the form C(BI-RADS i,Class j) denote the cost of an assigning an image to class j (when it was assigned during training or would be predicted implicitly during operation) to be assigned a BI-RADS category of i. Costs are not necessarily monetary. A cost can represent wasted time or other resources, severity of illness, patient stress levels etc.

The present inventive concept recommends a clinical action that will be the minimum cost objective function subject to constraints on performance such as not missing a single cancer while minimizing the costs of the clinical decisions made. For example the cost of mistaking a cancer for benign could be taken to be a very high cost whereas the cost of mistaking a highly suspicious region for cancer when it is actually benign might have a lower cost. These costs are assigned on a case by case basis so that the cases that are more difficult to diagnosis by the operator/s, as evidence by the training data, are weighted more heavily than the less difficult cases with the new invention.

The minimum cost decision is defined here in the following way: We assign the lesion within the ROI represented by feature vector x as belonging to class 0 if the cost for class 0 is less than the cost for class 1.

That is if L(x, 0)<L(x, 1) then decide the image is in category 0

If L(x, 0)>L(x, 1) the decide x belongs to class 1 and if L(x, 0)=L(x, 1) decide x belongs to either class 0 or 1

The present invention teaches a new CAD device which recommends the class that will provide the optimum decision based on the image which provides the minimize cost. The invention trains the computer assisted diagnosis CAD system with clinical based costs to ensure the recommendation is optimum in terms of cost effectiveness. The present inventive concept can be used with most types of pattern classifiers to provide enhanced performance in terms of reducing biopsies or recalls by weighing the error terms in the loss function so that error terms corresponding to clinically relevant actions such as biopsies or recalls are more strongly weighted in the learning process. In addition, an iterative process can be used where the weights are adjusted depending on the difficulty found in minimizes a terms from a previous iteration (in addition to the initial difficulty weight used by clinical data like most common BI-RADS score errors made by radiologists). The present inventive concept of weighting the objective function to emphasize the clinically difficult cases can be that used for many types of classifiers such as neural networks, support vector machines, naive Bayes classifier, genetic programming, reinforcement learning, and deep neural networks by appropriating weighting the objective function optimized during training.

The terms cost and loss functions are synonymous (sometimes called objective or error function). The approach generally used in training a classifier is to define an objective function first, then the classifier is found that optimizes this function. The present inventive concept modifies this objective function on an instance by instance basis by weighting clinically difficult examples. The objective function could include: posterior probabilities for classifiers such as that used for naive Bayes classifiers, fitness function for genetic programming classifiers, total reward/value function for reinforcement learning, information gain and child node impurities for classification and regression tree (CART) decision tree classification, mean squared error cost (or loss) function for CART, decision tree regression, linear regression, adaptive linear neurons, log-likelihood or cross-entropy loss (or cost) function or hinge loss for support vector machine classifiers.

Any of these objective function can be weighted during training to emphasize the clinically difficult examples. The difficult examples can be selected by individual, medical group, locality or any subset or set of diagnosis professionals. The system works as a recommendation engine which is customized to give maximum assistance to the operator for clinical difficult cases. In addition to correcting errors made by human operators by incorporating a weighted error function on the "difficult examples," the current invention may also use an iterative training method that identifies examples that are "difficult to learn" by the classifier itself after a first step and then re-training the CAD system to weigh those difficult cases more heavily on a iterative basis by first training the CAD system and seeing which important examples are not training up well, and then re-training; where those cases are weighed more heavily to make sure clinical important cases are corrected to the fullest extent possible before completing the training phase of the classifier.

Figure 4:
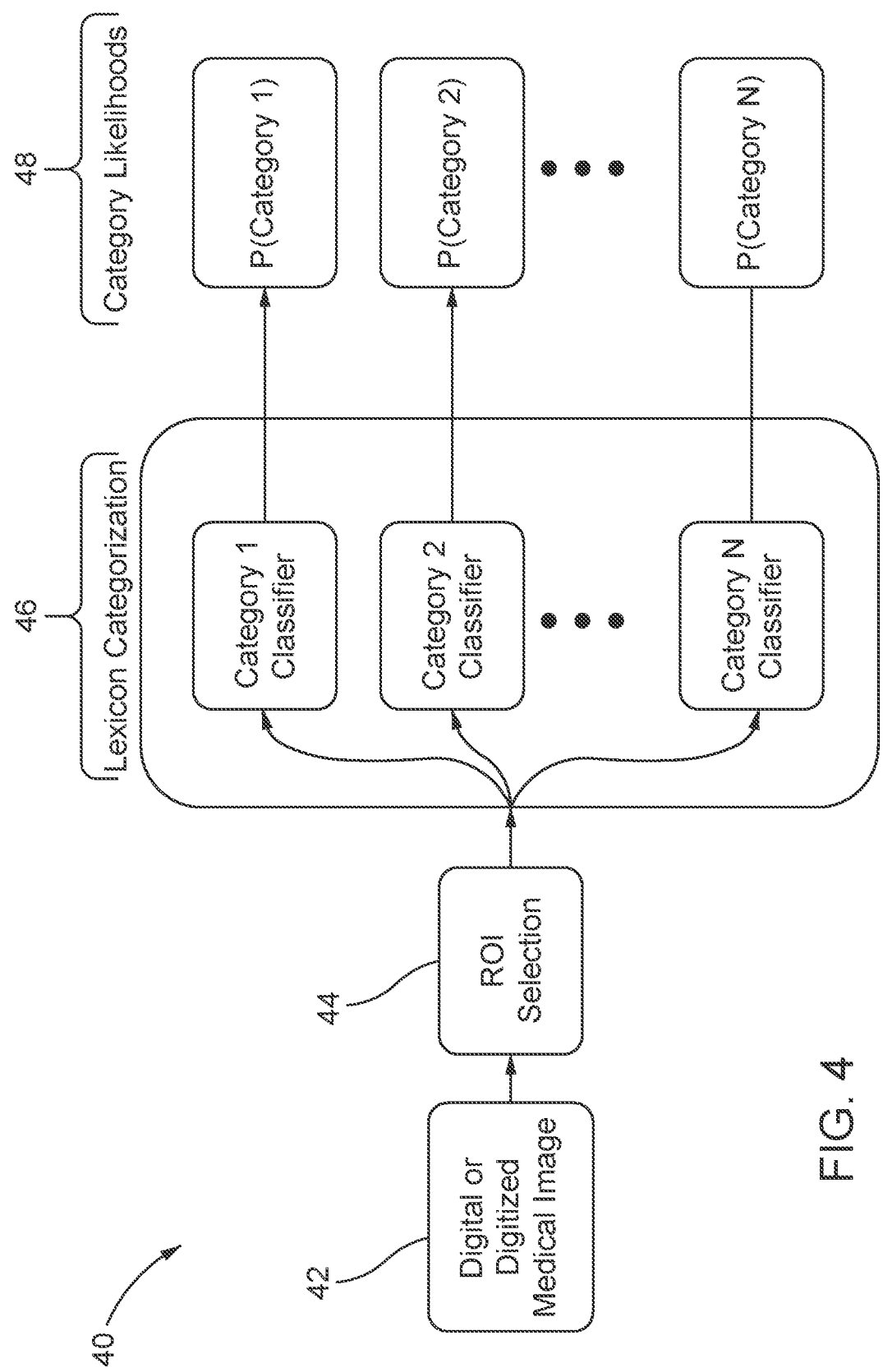
FIG. 4 is an exemplary process flow, according to aspects of the present inventive concept.
Figure 5:
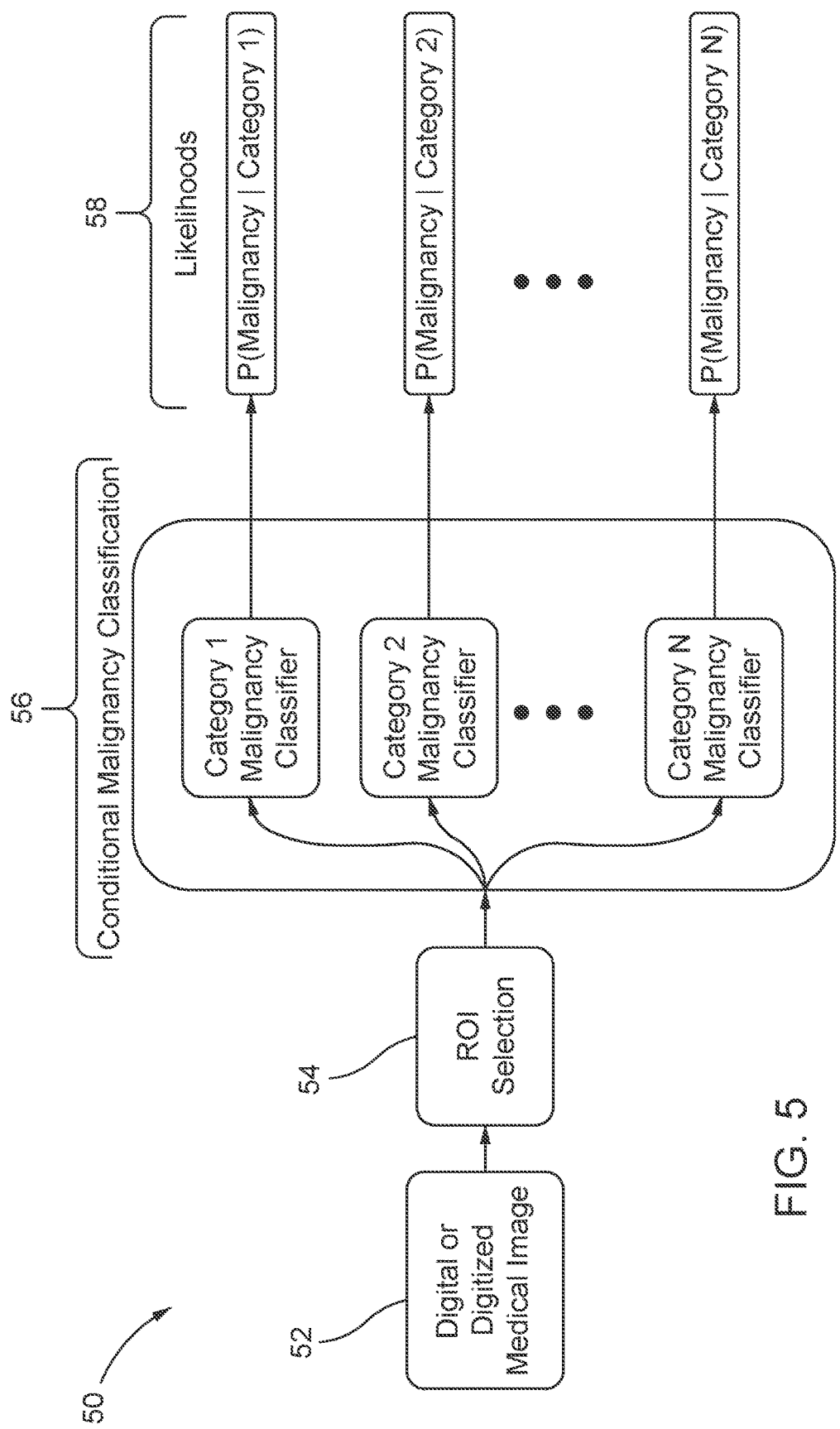
FIG. 5 is an exemplary process flow, according to aspects of the present inventive concept.
Figure 6:
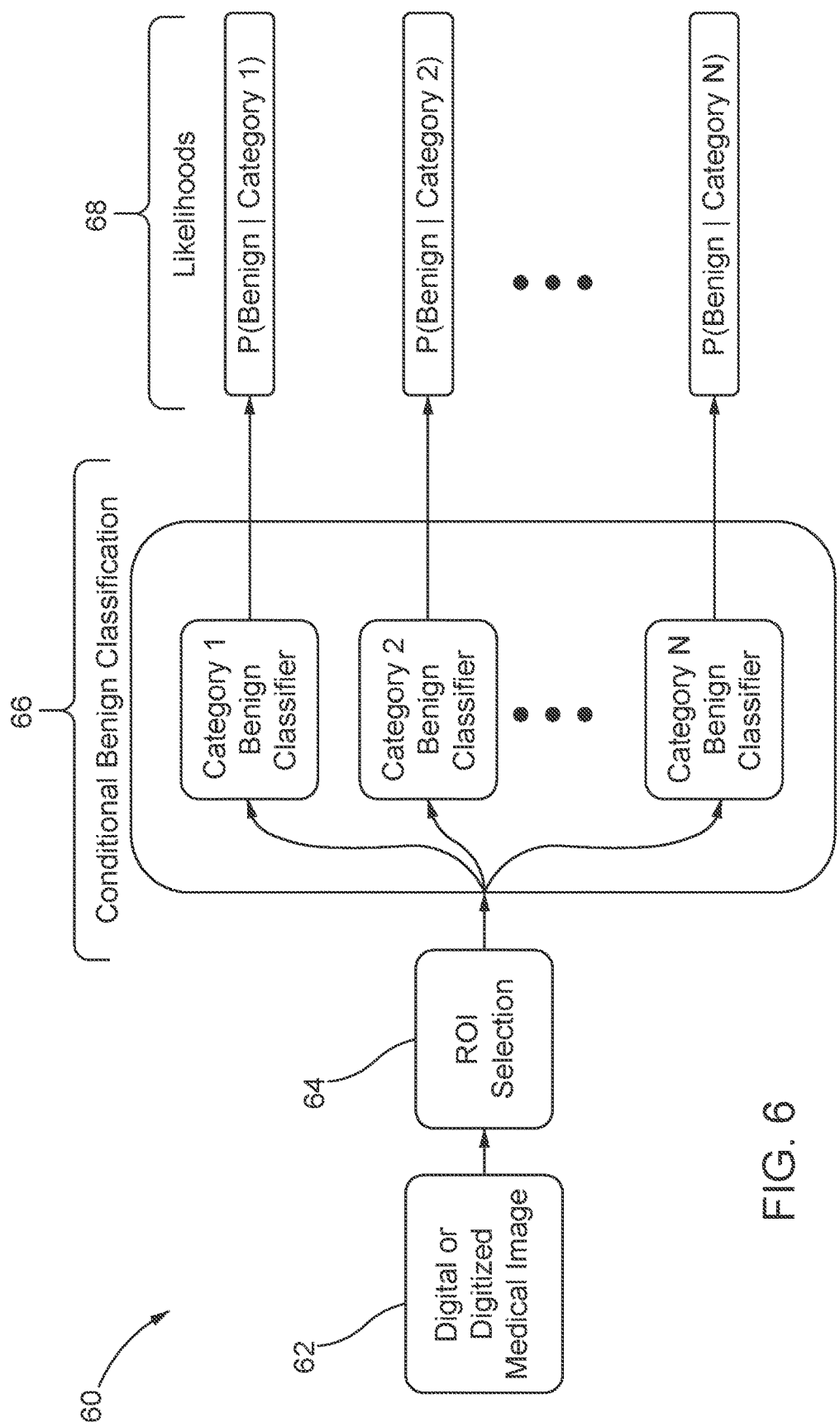
FIG. 6 is an exemplary process flow, according to aspects of the present inventive concept.

The CAD system 20 is operable to decrease a number of discrepancies corresponding to the class that is more heavily weighted in the objective function. An example implementation of the present inventive concept is illustrated in FIGS. 4-6. It has been shown that, using the CAD system 20, where each type of error is equally weight and the number of false positives (the number of unnecessary biopsies in this case) are reduced by 24.5%, as compared with conventional systems. Specifically, via the CAD system 20 of the present inventive concept, with W1=W2=W3=W4=1, clinically significant false positive reduction is 24.55%.

Further, when the training is performed via the CAD system of the present inventive concept with more weight distribution on W3 so that W1=W2=W4=0, W3=1, clinically significant false positive reduction is 31.85%.

The CAD system 20 of the present inventive concept is operable to provide machine training, or machine learning that improves an ability of a user of the CAD system 20 to identify and/or characterize regions of suspicion within a medical image. For instance, data from one or more of the categories of the image reporting and data system as labeled by a top radiologist or group of top radiologists can be studied and used for a training set in view of best practices according to the image reporting and data system. An additional training set may be added to the training set which includes the recommended clinical actions made by a specific individual or group of experts to personalize the corrective effect of the resulting CAD system 20. As such, computing devices associated with the present inventive concept may be trained to predict discrepancies between the action recommended by the image reporting as exemplified by a specific individual or group and data system versus the optimal action based on biopsy proven training data to take for the given region of interest of the input image. For example, regions of interest that are labeled BI-RADS 4a by an expert may be used to train a classifier to recommend a biopsy only for the images that were determined to be cancer retrospectively. The resulting CAD system 20 can then enhance the performance of an overlaying image reporting and data system in its ability to recommend not performing a biopsy on lesions that are determined to be benign with a high degree of confidence. In addition, to the degree that the CAD system's recommendations become accepted by radiologists, there will be more agreement among the various operators using the present inventive concept. The CAD system 20 is operable to utilize features that are based on morphology (lesion shape) and/or the texture of the lesion. For example features such as Histogram of oriented gradients (HOG), Local Binary patterns (LBP), and Gray level co-occurrence matrix (GLCM) can be used to represent the lesion within the ROI. Many different classifiers could also be used in the system, such as Neural Networks, Hidden Markov Models (HMMs), Random forests, and support vector Machines (SVM), and the like. Several modern classifiers such as convolutional neural networks can be utilized that learn their own features from the raw pixel data and use a cost function which can also be weighted in the manner described for the present inventive concept. The system of the present inventive concept is unique in that, among other reasons, it is trained to indicate when a discrepancy occurs in the assessment category that would usually be recommended by the Image Reporting and data system with the action that would be optimal for the lesion as represented by the region of interest.

The system of the present inventive concept may be configured to output, e.g., via a display of a computing device associated with the radiology workstation 22, at least one image with highlights in one or more areas of the ROI that had a strong impact (as compared to other areas of the ROI) on the recommended clinical decision. It is foreseen that system of the present inventive concept may be configured to position a film over the original image to clearly indicate, e.g., to a use of the system, an impact each sub-region had on the recommended clinical decision.

The aforementioned may be achieved in one aspect of the present inventive concept by providing a method to assist in diagnosis of a disease state within an image. The method may include the steps of acquiring an image, identifying one or more regions of interest within data of the image, and/or using a CAD system configured to recommend at least one clinical action based on a minimization of discrepancies between an evidentiary based action and traditional system recommended actions. The image may be a medical image of a patient in a digital or digitized format. The image may be a plurality of images.

The method may further include the step of training the CAD system 20 via input data. The method may further include the step of pooling multiple images of a lesion via the CAD system 20 to increase confidence into existing BI-RADS or bucket classifications where the buckets are defined to help the operator in making clinical decisions. The CAD system 20 may be configured to process data using an optional category entered by a user. The optional category may be an IRADS category. The CAD system 20 may be configured to process data using a computer assisted category system. The computer assisted category system may be IRADS. The CAD system may be configured to imply a category. The implied category may be IRADS.

At least one of the outputs of the CAD system 20 may be an image with highlights in areas of the ROI having a strong impact on the recommended clinical decision, as compared with other areas, e.g., of the ROI and/or surrounding the ROI. The method may further include the step overlaying a color overlay, e.g., a filter or film, over or on top of the original image to indicate an impact of each sub-region, e.g., on the recommended clinical decision.

The aforementioned may be achieved in another aspect of the present inventive concept by providing a system configured to assist in diagnosis of a disease state within an image. The system may include a processor configured to (i) receive an input in the form of an image, (ii) identify one or more regions of interest within data of the image, and/or (iii) output a recommend clinical action via a user interface. The user interface may be a display in communication with the system. The recommended clinical action is based on a minimization of discrepancies between an evidence based action and traditional system recommended actions.

The image may be a medical image of a patient in a digital or digitized format. The image may be a plurality of images. The system may be configured to be trained via input data. The processor may be configured to pool multiple images of a lesion to increase confidence in its classification. The processor may be configured to process data using an optional category entered by a user. The optional category may be an IRADS category. The processor may be configured to process data using a computer assisted category system. The computer assisted category system may be IRADS. The processor may be configured to imply a category. The implied category may be IRADS.

The present inventive concept can be used for interactive applications where the expert checks a ROI on an image to see if it is a suspicious mass.

The CAD system 20 may be configured to provide an indication, via one or more color overlays, e.g., a filter or film, over or on top of sub-areas of the ROI to provide user feedback, i.e., facilitate as to which sub-areas of the ROI are correlated with benign, malignant or non-informative features of the ROI. This operator can use this feedback as a training tool as well as to increase confidence in the CAD recommendation.

At least one of the outputs is an image with highlights in areas of the ROI with a strong impact on the recommended clinical decision, as compared with other areas, e.g., of the ROI and/or surrounding the ROI. The system may be configured to utilize a color overlay on the original image to indicate an impact of each sub-region, e.g., on the recommended clinical decision.

Figure 7:
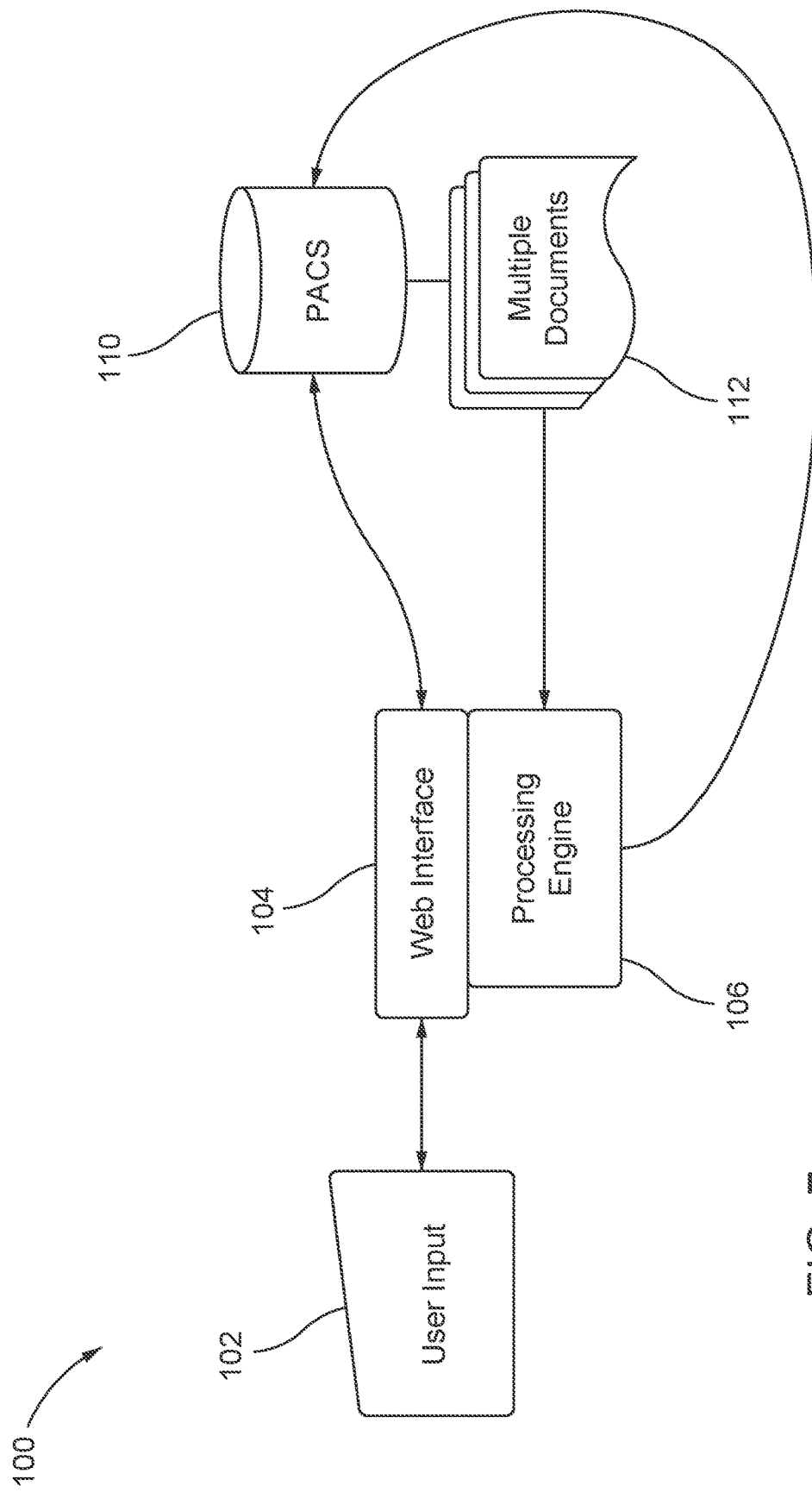
FIG. 7 is an architecture design chart, according to aspects of the present inventive concept.

FIG. 7 is an exemplary design architecture 100 chart, illustrating some aspects of the CAD system 20 of FIG. 2. As shown, a user input 102 may be provided for, e.g., a radiology workstation 22 in order for a radiologist or other type of user to interact with the other shown components. The user input 102 may comprise a touchpad, keyboard, mouse, or other such input device coupled to a computing device of the radiology workstation 22. The design architecture 100 may comprise a user interface such as a web interface 104, a processing engine 106 which may be software/hardware components of the CAD web and processing server 28 and/or the CAD lesion application 12; configured to analyze images identified by a user. As further shown, the processing engine 106 and web interface 104 may be in communication with a PACS database 110 (which may be associated with the PACS server 26) in order to retrieve multiple documents 112, e.g. medical images. A user interface (UI), such as a web interface, allows remote computing devices to access functionality of the CAD lesion application 12 and the CAD system 20.

Figure 8:
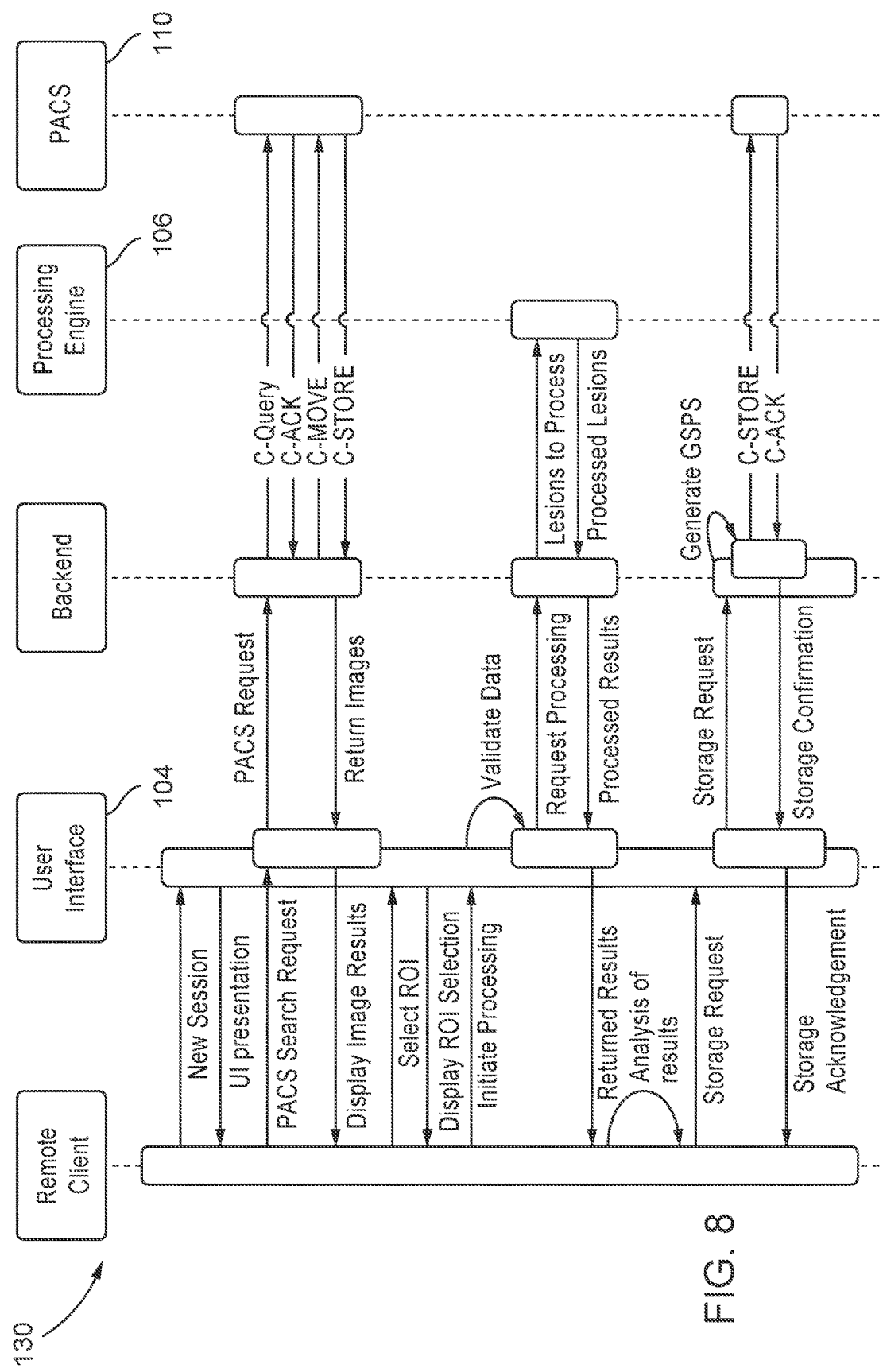
FIG. 8 is a protocol sequence diagram, according to aspects of the present inventive concept.

FIG. 8 is a protocol sequence flow diagram 130 showing transactions for a full end to end scenario implementing the CAD system 20. As shown, a remote client, e.g., a computing device associated with a radiology workstation 22, may initiate a new session with the user interface 104, in order to access and interact with aspects of the CAD lesion application 12 and CAD web and processing server 28. The remote client may initiate a new session, and a UI presentation may be transmitted to the remote client. The remote client may then request a PACS search. In order to respond to the request, the CAD lesion application 12 may interpret the request and pass that request to backend portions of the CAD system 20. More specifically, the CAD lesion application 12 may initiate queries to the PACS database 110 to response to the request of the remote client.

Figure 9:
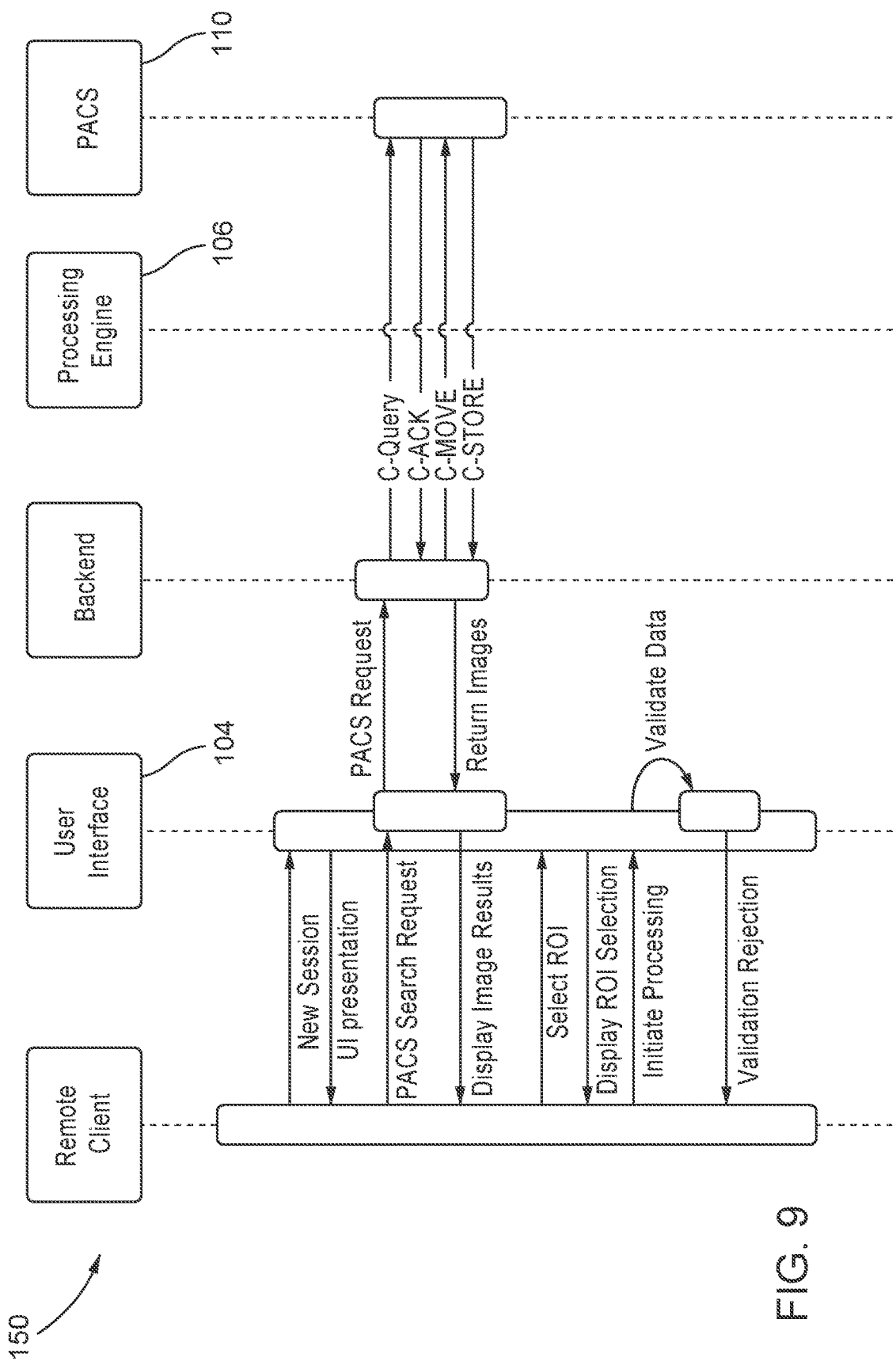
FIG. 9 is another sequence diagram, according to aspects of the present inventive concept.

The queries to the PACS database 110 may return a plurality of images, which may be displayed to the remote client using the web interface 104. As further shown, an ROI may then be selected, which may initiate a series of image processing steps by the CAD lesion application 12. Specifically, the CAD lesion application 12 may validate data, execute methodology described herein, and return an analysis. The remote client may further initiate a storage request. A GSPS may be generated and one or more images and associated analysis data may be stored. FIG. 9 illustrates a case where an image is requested from the PACS server 26 that has a DICOM service-object pair unique identifier (SOPID), which is a unique number used to identify a current instance of code being executed in DICOM, that is not supported for processing (i.e., not an ultrasound image).

Figure 10:
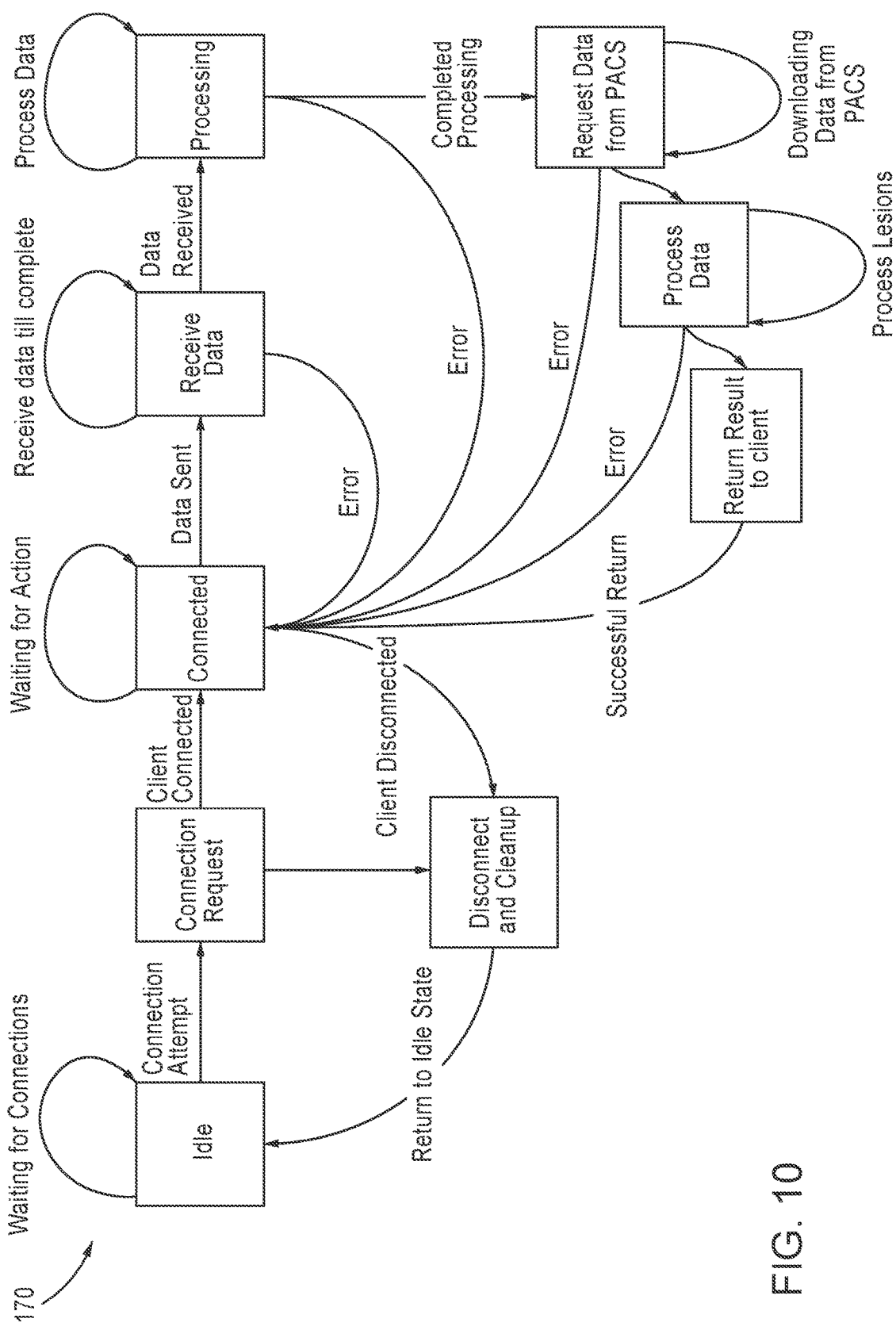
FIG. 10 is a state diagram for a CAD lesion application illustrating exemplary packet structure and a sequence of state transitions, according to aspects of the present inventive concept.

FIG. 10 illustrates possible interface requirements for the CAD lesion application 12 over the network interface with the packet structure shown. The interaction with a client, such a radiology workstation 22, may be conducted as a sequence of state transitions as shown. FIG. 10 may encompass the entirety of the network interfacing with the CAD lesion application 12.

Figure 11:
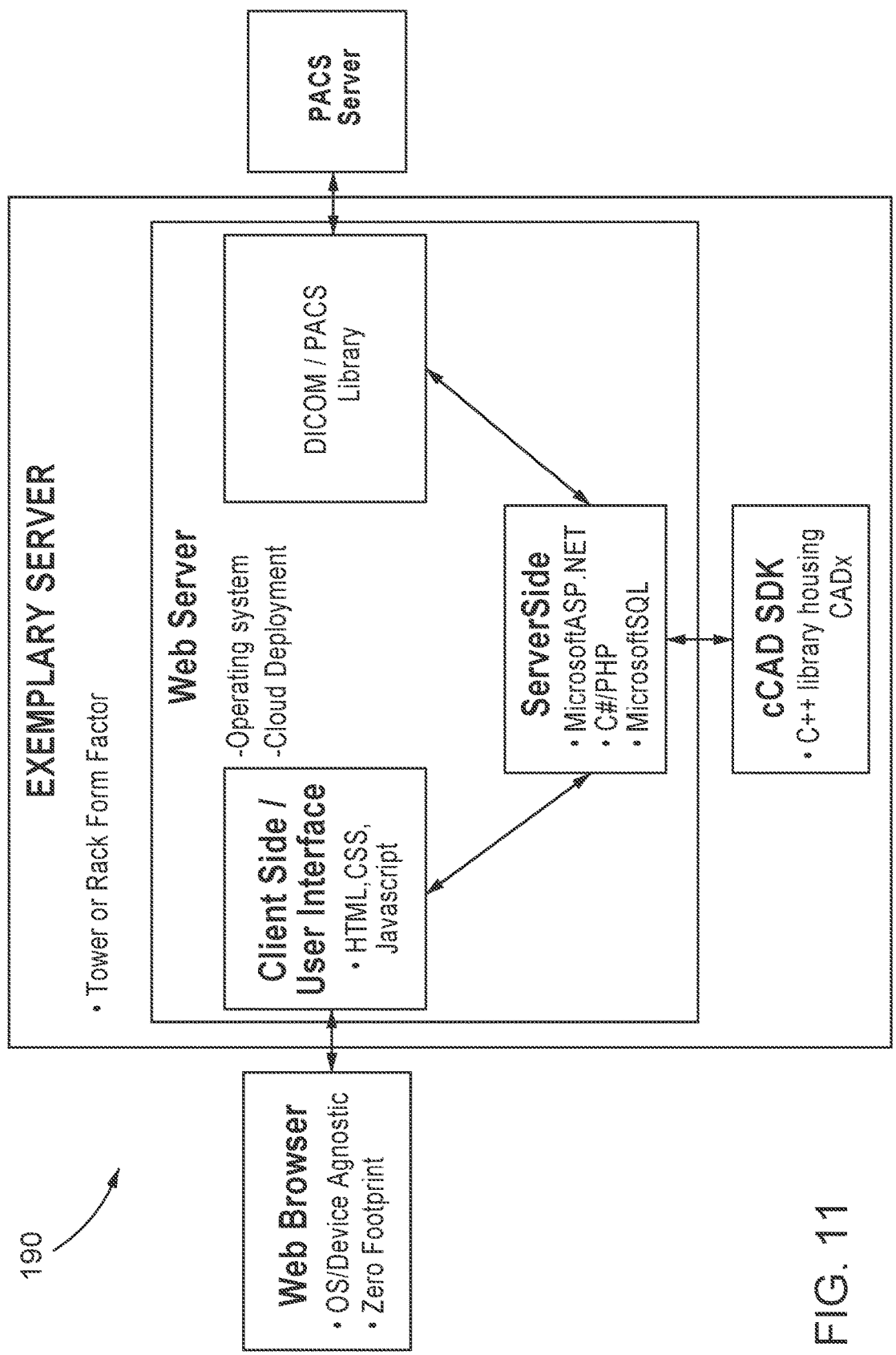
FIG. 11 is an exemplary design specification for a computing system implementing the CAD lesion application, according to aspects of the present inventive concept.
Figure 12:
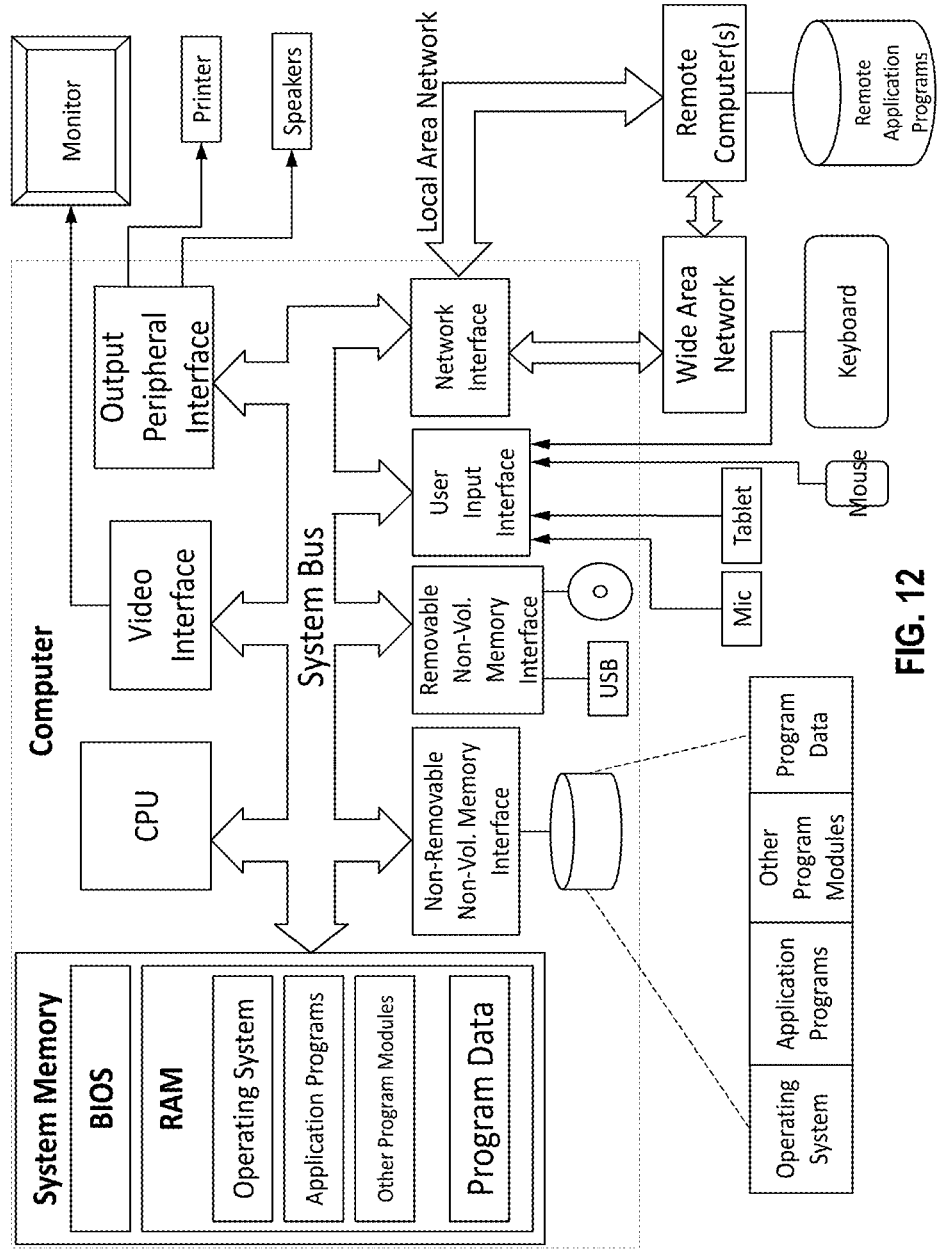
FIG. 12 is an exemplary computing system that may implement various services, systems, and methods discussed herein.

FIG. 11 illustrates a detailed design view 190 of one embodiment of the CAD web and processing server 28 implementing a plurality of exemplary software and hardware utilities. As shown, the CAD web and processing server 28, or a computing device implementing the CAD lesion application 12, may utilize e.g. a Windows-based system, cloud deployment services such as Amazon Web Services, and the like. The features shown are merely exemplary and the present inventive concept is not limited in this regard. FIG. 12 is an exemplary computing system that may that may implement various services, systems, and methods discussed herein. Specifically, a computing environment 200 is shown, which may comprise or be associated with a computing device or the described CAD computing device. The computing environment comprises at least one processor or central processing unit (CPU) to execute aspects of the CAD lesion application 12, system memory storing aspects of the CAD lesion application 12, input components such as a keyboard and mouse, a network interface, and a display device or monitor.

Figure 13:
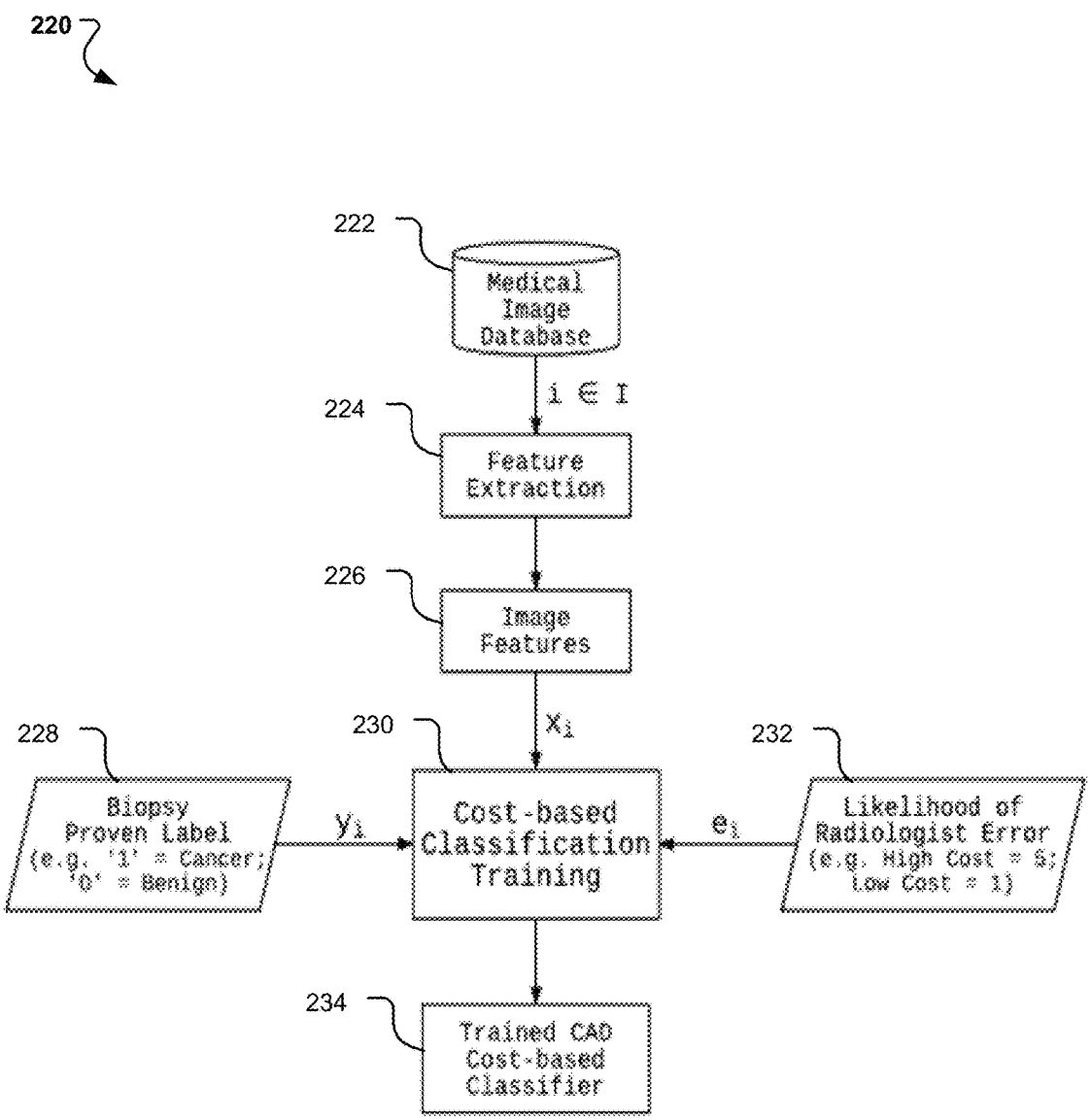
FIG. 13 illustrates the learning (or training) phase of the clinically based weighting cost function CAD computing device using clinical data to weigh the image input data in learning the output classifications, according to aspects of the present inventive concept.

FIG. 13 illustrates a learning, or training phase 220 of the clinically based weighted cost function CAD computing device using clinical data to weight the image input data in learning the output classifications. As shown, an image may be retrieved or otherwise accessed from a medical image database 222. In block 224, a process of feature extraction may be employed to extract one or more image features from the image. In block 226, image feature values from the image features of the image may be extracted or otherwise accessed. In block 230, a cost-based classification process 230 may be utilized (machine learning) which takes as inputs at least a proven biopsy label 228, and a likelihood of radiologist error 232. The output from the cost-based classification training process 230 is a trained CAD computing device with a cost-based classifier 234. The training phase may be implemented on a CAD computing device using aspects of the CAD lesion application 12.

Figure 14:
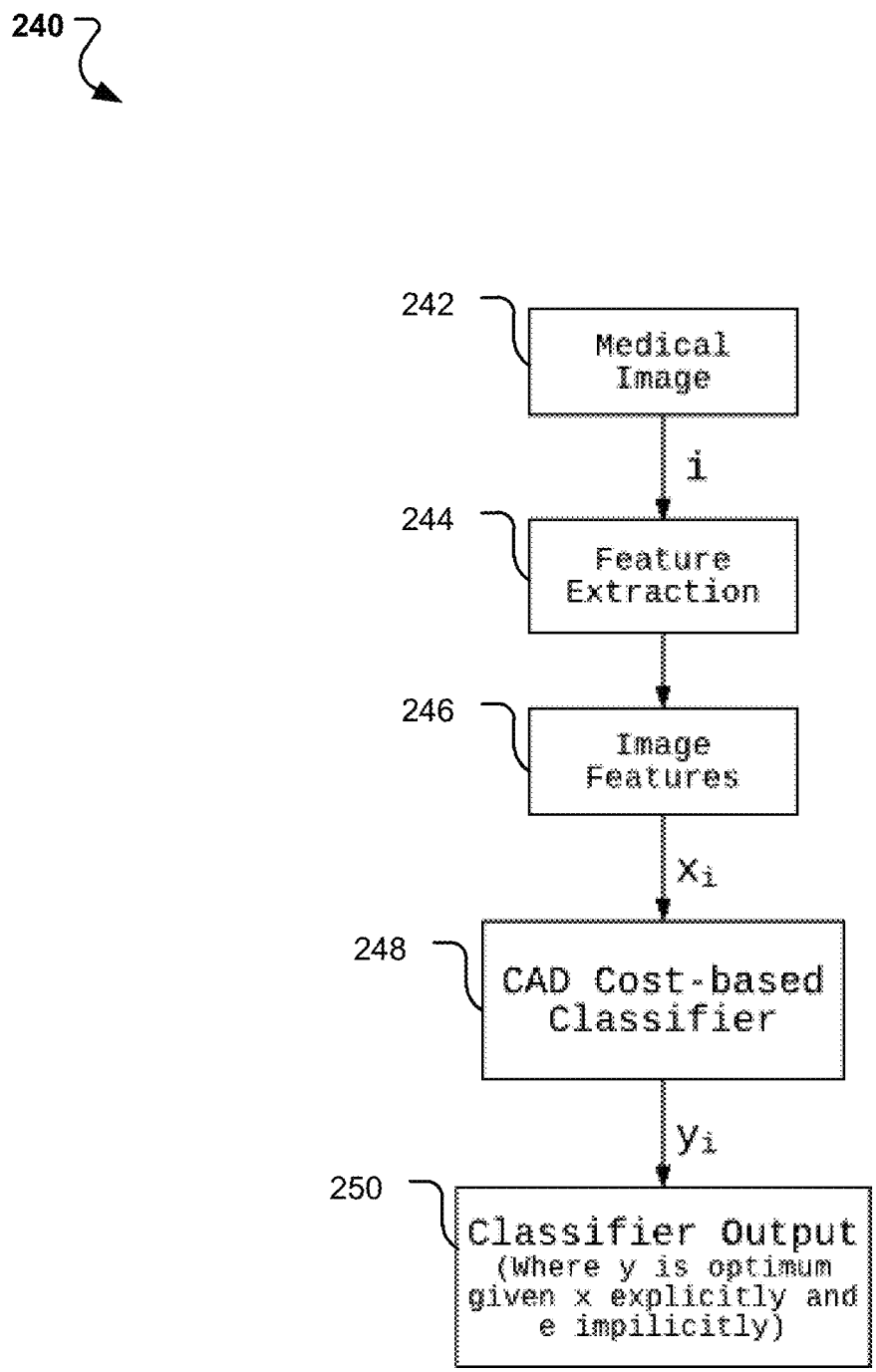
FIG. 14 illustrates the operation of the clinically based weighted cost function CAD computing device using medical image input and classification output, according to aspects of the present inventive concept.

FIG. 14 illustrates an operation 240 of a clinically based weighted cost function CAD computing device using medical image input. As shown, a selected medical image 242 may be retrieved by a CAD computing device, or otherwise made accessible to the same. The selected medical image may comprise one or more lesions or abnormalities that need to be classified within e.g. a BI-RAD classification lexicon. In blocks 244 and 246, image feature values may be extracted or otherwise accessed from the selected medical image. In block 248, the image feature values are processed using the CAD cost-based classifier 234 of FIG. 13. The result, in block 250, is a classifier output, which gives one or more classes for the image feature values using the CAD cost-based classifier. The above classification phase or operation 240 may be implemented on a CAD computing device using aspects of the CAD lesion application 12.

Figure 15:
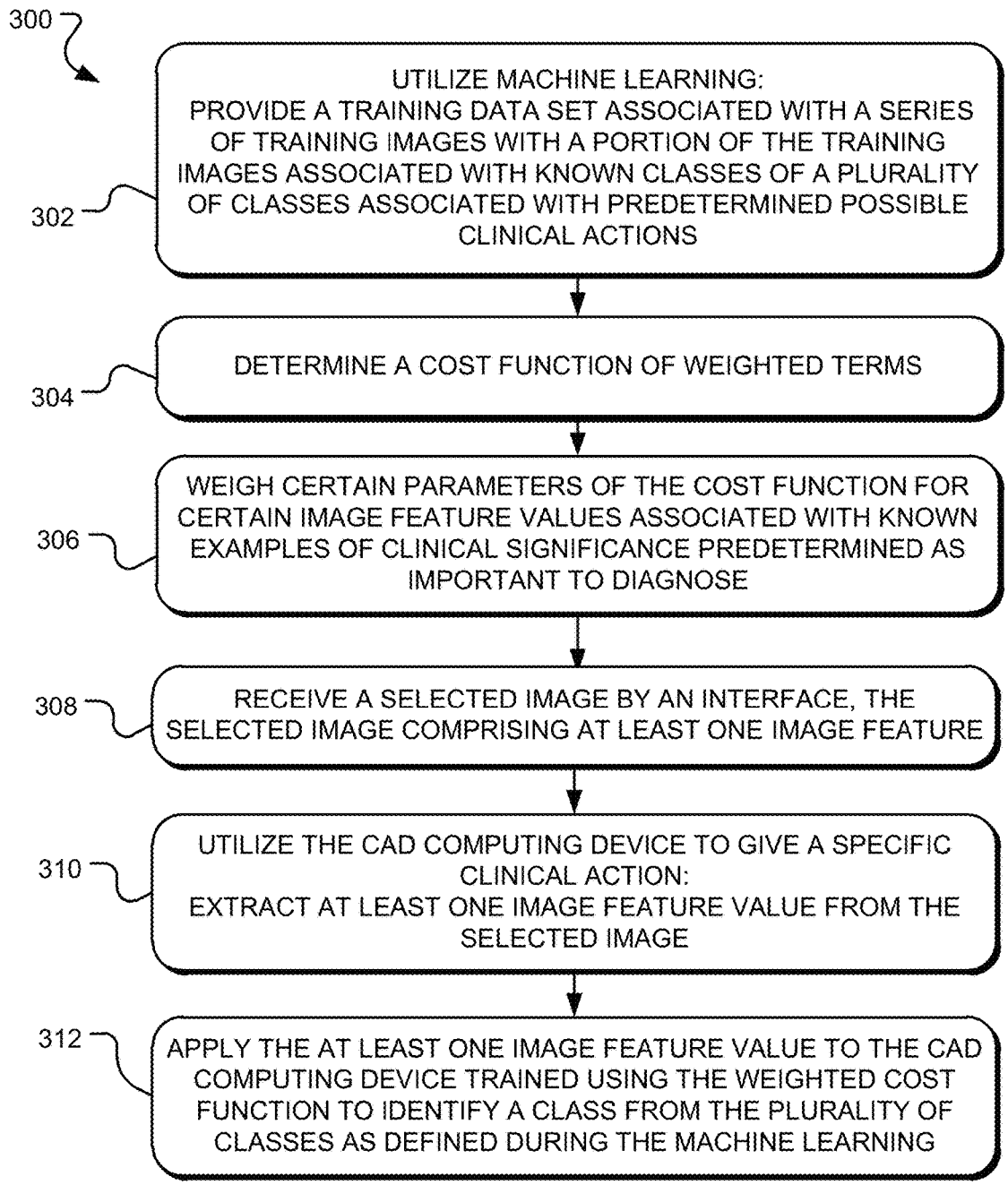
FIG. 15 is an exemplary process flow implementing aspects of FIGS. 13 and 14, according to aspects of the present concept.

FIG. 15 is an exemplary process flow 300 illustrating aspects of FIGS. 13 and 14. The process flow 300 describes a method of using machine learning to train a CAD computing device, and then utilizing the CAD computing device, trained via the machine learning, to give a specific clinical action. Machine learning encompasses computer science methodologies to train, or teach computing devices to learn without being explicitly programmed to arrive at a particular output. Machine learning may comprise various functions, logic, and algorithms to teach a computing device to grow and change with respect to decision making as the computing device is exposed to new data. Specifically, a model or rule set may be built and used to predict a result based on values of one or more features. A "trained" computing device, in the context of machine learning, may be a computing device that has been used to build one or more models, functions or algorithms from an example training data set of input observations in order to make data-driven predictions or decisions expressed as outputs based on known properties learned from a training data set (rather than following strictly to static programming instructions).

During a testing or training phase, a predetermined group of data patterns, called the "training data set," is presented to the computing device for classification. The actual result produced by the computing device is then compared with a known correct result, usually with reference to a function. A known correct result may be, e.g., a result that is predetermined to be correct by an expert in the field, or based on evidence or collective agreement. One objective of the training phase is to minimize discrepancies between known correct results and outputs by the computing device based on the data patterns. Results from an output of the computing device may then be used to adjust certain parameters of the function and the computing device, in such a way that if a data pattern were presented to the computing device another time, the computing device would theoretically produce a different output consistent with known correct results. Training of a computing device, using such machine learning methods, may be said to be complete when subsequent test data is presented to the computing device, the computing device generates an output on that test data, and a comparison between the output and known correct results yields a difference or value that is within a predetermined acceptable margin.

In block 302 of FIG. 15, machine learning may be utilized to train a computing device, such as a CAD computing device, by a first step of providing a training data set associated with a series of training images to the computing device. The series of training images may comprise medical images, showing a particular area of the human body, such as a human breast. In particular, in one specific embodiment, the training images may comprise images of a portion of a breast with malignant or benign lesions. Each of the images, depending upon the lesion shown, may comprise different characteristics, such as color, shading, and the like. At least a portion of the training data set may comprise image features, from the training images, that are associated with known classes of a plurality of classes. For example, a class 1 may be associated with or assigned to an image feature of a first training image, and a class 2 may be associated with or assigned to an image feature of a second training image. Image features may be vectors, or other values of a particular image, such as a medical image. In other words, at least a portion of the training data set may provide examples to the computing device about when images features should be assigned to one or more classes.

As further shown in block 302, each of the classes may be associated with predetermined possible clinical actions. Clinical actions may comprise, for example, certain tasks or procedures that should be taken based on image features. As an example, a clinical action may comprise performing a biopsy on a lesion to remove a tissue sample of the lesion and submit the tissue sample for testing and analysis. Another clinical action may comprise following up with a patient and lesion after a predetermined period of time, such as six months.

In blocks 304 and 306, a cost function of weighted terms may be determined based upon the training set data as applied to the computing device. In addition, certain parameters of the cost function may be weighted for certain image feature values associated with known examples of clinical significance that are predetermined as being important to diagnose. For example, the certain parameters may be weighted to account for a difficulty of a radiologist or other clinician to accurately diagnose an image feature as belonging to one or more of the plurality of classes.

In one specific embodiment, the described machine learning may be utilized to train a computing device to give clinical decisions in the specific context of possible cancer diagnosis. A training data set in the form of a preselected group of data patterns, which identifies relationships between a plurality of image features and known correct BI-RAD classifications, may be presented to the computing device for classification. The training data set may identify, for example, that an image feature (of e.g. a lesion) that appears to the human eye as having a particular shade, color, or other visual characteristic has been deemed to fall within class 4 according to a BI-RAD lexicon. The image feature may further comprise a particular value (pixel); e.g. the training data set identifies for the computing device a particular value of one or more pixels associated with an image feature. As such, the training data set further identifies for the computing device a pixel value or set of pixel values that are associated with image features that that have been deemed to fall within one or more BI-RAD classes.

An actual output produced by the computing device, in response to training image, may be compared with a known good result, with reference to a cost function. In one embodiment, it may be ideal to minimize such a cost function, to minimize errors outputted by the computing device regarding how image features should be classified with respect to classes of a BI-RAD lexicon. Aspects of this comparison may be utilized to adjust certain parameters of the computing device and/or the cost function, such as weights or biases and subsequently lower cost when the computing device is presented with another image. In addition, certain parameters of the cost function may be weighted for certain image feature values associated with known examples of clinical significance that are predetermined as being important to diagnose. For example, the certain parameters may be weighted to account for a difficulty of a radiologist or other clinician to accurately diagnose an image feature as belonging to one or more of the plurality of classes which may be especially important where the clinician is faced with a decision as to whether or not to recommend a biopsy for a lesion. The above process may be repeated until the cost function, averaged over a suitable second preselected group of data patterns or validation set, is minimized. In such an embodiment, training of the computing device to give clinical actions for BI-RAD lesions may be deemed complete when subsequent test data is presented to the computing device, the computing device generates an output on that test data, and a comparison between the output and known correct results yields a difference or value that is within a predetermined acceptable margin. The present disclosure is not limited to training a computing device in the context of lesions for possible breast cancer. The trained computing device may be implemented for a variety of related applications such as training the computing device to generate decisions in the context of radiology, ultrasound, and the like.

By the very nature of using machine learning in this capacity, specifically, using weighted parameters of the cost function, the parameters weighted for certain image feature values associated with known examples of clinical significance that are predetermined as being important to diagnose, the functioning of the computing device is improved by supplementing the computing device with the ability to make more informed, accurate clinical decisions on behalf of a clinician. In addition, the trained computing device comprises a computing technology which provides an improvement to a separate technological field, such as medical diagnosis and analysis and medical imaging. Stated another way, machine learning may be utilized to improve medical imaging.

FIG. 15 further describes a classification phase. In block 308, a selected image may be received by the computing device using an interface. This step may incorporate aspects described above. For example, the image may be retrieved from a PACS server by a clinician, and may be transmitted to the computing device using a web interface. The selected image may arrive at the computing device with a selected ROI. Alternatively, in some embodiments, the computing device may be programmed to identify possible regions of interest, having been trained with a plurality of different testing or training images. Specifically, the computing device may scan the selected image, retrieve image features from the selected image, extract values from the selected image, and match the values to predetermined values that the computing device has been programmed to recognize as being associated with lesions or other abnormalities. In either case, a selected image comprises at least one image feature accessible to the computing device for analysis.

In block 310, the computing device may extract at least one image feature value from the selected image. The selected image feature value may be associated with a numeric value and may, in some embodiments, be a pixel value or set of pixel values for the at least one image feature value. Extracting a value from a selected image feature in this fashion breaks down an image feature into data understandable by the computing device, and, data that can be utilized with one or more cost functions or other functions developed during machine learning.

In block 312, the computing device is utilized by applying the at least one feature value to the computing device which has been trained using the weighted cost function. The computing device then outputs a class from the plurality of classes as defined during the machine learning process. For example, for a given image feature value, the computing device may output a BI-RAD classification of 4, indicating that the image feature value is associated with a lesion that is suspicious and should be subject to further diagnosis. The steps of process flow 300 may be implemented on a CAD computing device using aspects of the CAD lesion application 12. Specifically, the machine learning, training of the computing device, and classification of a selected image may be implemented using the CAD lesion application 12.

Additional aspects, advantages, and utilities of the present inventive concept will be set forth in part in the present description and drawings and, in part, will be obvious from the present description and drawings, or may be learned by practice of the present inventive concept.

The present description and drawings are intended to be illustrative and are not meant in a limiting sense. Many features and sub-combinations of the present inventive concept may be made and will be readily evident upon a study of the present description and drawings. These features and sub-combinations may be employed without reference to other features and sub-combinations.

What is claimed is:

1. A method to assist in diagnosis of a disease state associated with a set of images, the method comprising the steps of:
   receiving, at a computer-assisted diagnosis (CAD) system, data associated with the set of images;
   identifying, at the CAD system, one or more regions of interest in the data;
   processing, at the CAD system, the data to define processed data;
   defining, at the CAD system, a function including a set of error measures indicating discrepancies between (i) validated actions for a set of lesions associated with non-imaging data of the set of lesions and (ii) recommended actions for the set of lesions made by a set of users based on image data of the set of lesions;
   constructing, at the CAD system, using the function, a model for predicting clinical actions for the set of lesions based on the image data of the set of lesions, the model configured to account for errors based on an error profile of the set of users; and
   determining, at the CAD system, a clinical action associated with the one or more regions of interest using the model and the processed data.

2. The method of claim 1, wherein:
   each image from the set of images is a medical image of a patient in a digital or digitized format, and
   the set of images includes one image or a plurality of images.

3. The method of claim 1, wherein the one or more regions of interest is associated with a lesion, the method further comprising the steps of:
   pooling multiple images of the lesion from the set of images, via the CAD system, to increase confidence in a classification of the lesion.

4. The method of claim 1, wherein the processing, via the CAD system, the data includes processing the data using a category entered by a user from the set of users,
   the category being an image reporting and data system (IRADS) category.

5. The method of claim 1, wherein the processing, via the CAD system, the data includes processing the data using an image reporting and data system (IRADS).

6. The method of claim 1, further comprising the step of implying, via the CAD system, a category,
   the category being an image reporting and data system (IRADS) category,
   the determining of the clinical action made based on the category.

7. The method of claim 1, further comprising the step of providing an output including an image from the set of images with highlights in areas of the one or more regions of interest having an impact on the clinical action greater than that of other areas of the one or more regions of interest.

8. The method of claim 1, further comprising the step of:
   overlaying a color overlay on each image from the set of images to indicate an impact of each region of interest from the one or more regions of interest on the clinical action.

9. The method of claim 1, wherein the function includes weights that are associated with difficulty levels of accurately diagnosing each lesion from the set of lesions, the difficulty levels estimated from the set of error measures,
   the constructing the model including constructing the model using the function including the weights.

10. The method of claim 1, wherein the validated actions for the set of lesions are based on biopsy data of the set of lesions.

11. A system configured to assist in diagnosis of a disease state associated with a set of images, comprising:
    a processor configured to:
       receive an input including data associated with the set of images;
       identify one or more regions of interest within the data;
       define a function including a set of error measures indicating discrepancies between (i) actions associated with non-imaging data of a set of lesions and (ii) actions recommended by a set of users based on image data of the set of lesions;
       construct, using the function, a model for predicting clinical actions for the set of lesions based on the image data of the set of lesions, the model configured to account for errors based on an error profile of the set of users; and
       determine a clinical action associated with the one or more regions of interest using the model; and
       output an indication of the clinical action via a user interface.

12. The system of claim 11, wherein the non-imaging data includes biopsy data of the set of lesions.

13. The system of claim 11, wherein:
    the one or more regions of interest is associated with a lesion, and
    the processor is further configured to pool multiple images of the lesion from the set of images to increase confidence in a classification of the lesion.

14. The system of claim 11, wherein the processor is further configured to process the data to define processed data using a category entered by a user,
    the category being an image reporting and data system (IRADS) category, the processor configured to determine the clinical action using the model and the processed data.

15. The system of claim 11, wherein the processor is further configured to process the data to define processed data using a computer assisted category system,
the computer assisted category system being an image reporting and data system (IRADS),
the processor configured to determine the clinical action using the model and the processed data.

16. The system of claim 11, wherein the processor is further configured to output an image from the set of images with highlights in areas of the one or more regions of interest having an impact on the clinical action greater than that of other areas of the one or more regions of interest.

17. A non-transitory processor-readable medium storing code representing instructions to be executed by a processor, the code comprising code to cause the processor to:
receive data associated with a set of training images, each training image from the set of training images depicting a lesion from a set of lesions, the data including, for each lesion from the set of lesions, (i) a first action recommended by at least one user from a set of users based on a subset of training images from the set of training images and depicting that lesion and (ii) a second action based on non-imaging data of that lesion;
define a function including a set of error measures indicating discrepancies between the first action and the second action for each lesion from the set of lesions;
construct, using the function, a model for predicting clinical actions for the set of lesions based on the set of training images, the model configured to account for errors based on an error profile of the set of users;
receive an image for a patient;
identify a region of interest in the image;
determine a category for the region of interest; and
determine a clinical action based on (i) the category for the region of interest, and (ii) the model.

18. The non-transitory processor-readable medium of claim 17, the code further comprising code to cause the processor to display, on a user interface, the image with highlights in areas of the region of interest having an impact on the clinical action greater than that of other areas of the region of interest.

19. The non-transitory processor-readable medium of claim 17, the code further comprising code to cause the processor to overlay a color overlay on the image to indicate an impact on the clinical action of each area of one or more areas in the region of interest relative to that of other areas of the one or more areas.

20. The non-transitory processor-readable medium of claim 17, wherein the category is an image reporting and data system (IRADS) category.

21. The non-transitory processor-readable medium of claim 17, wherein the function includes one or more parameters, the code further comprising code to cause the processor to adjust the one or more parameters of the function based on the clinical action.

22. The non-transitory processor-readable medium of claim 17, wherein the code to cause the processor to determine the category for the region of interest includes code to cause the processor to:
extract one or more features from the image; and
compare the one or more features with a set of predetermined features, each predetermined feature from the set of predetermined features associated with an image reporting and data system (IRADS) category.

\* \* \* \* \*